(12) United States Patent  
Saito et al.

(10) Patent No.: US 7,571,967 B2  
(45) Date of Patent: Aug. 11, 2009

(54) BRAKE CONTROL APPARATUS FOR VEHICLE

(75) Inventors: Shigeru Saito, Kariya (JP); Masahiro Matsuura, Chiryu (JP); Koichi Kokubo, Kariya (JP); Yuji Sengoku, Aichi-ken (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 452 days.

(21) Appl. No.: 11/277,825

(22) Filed: Mar. 29, 2006

(65) Prior Publication Data

US 2006/0220453 A1    Oct. 5, 2006

(30) Foreign Application Priority Data

Mar. 31, 2005  (JP) .............................. 2005-102847
Mar. 24, 2006  (JP) .............................. 2006-082883

(51) Int. Cl.
 *B60T 8/64* (2006.01)
(52) U.S. Cl. .............................. 303/152; 303/3; 303/15
(58) Field of Classification Search ................. 303/152, 303/113.1, 3, 15
See application file for complete search history.

(56) References Cited

U.S. PATENT DOCUMENTS

| 5,472,265 | A | 12/1995 | Ohnuma |
| 5,549,371 | A | 8/1996 | Konaga et al. |
| 6,179,395 | B1* | 1/2001 | Schneider .................... 303/152 |
| 6,687,593 | B1 | 2/2004 | Crombez et al. |
| 2003/0062770 | A1* | 4/2003 | Sasaki et al. ................ 303/152 |
| 2006/0055239 | A1* | 3/2006 | Crombez et al. ............ 303/152 |

FOREIGN PATENT DOCUMENTS

JP         6-171489 A      6/1994

OTHER PUBLICATIONS

Official Action issued in corresponding Chinese Patent Application No. 2006100841623, May 23, 2008, Chinese Patent Office, CN; and English-language translation thereof.

* cited by examiner

*Primary Examiner*—Melanie Torres
(74) *Attorney, Agent, or Firm*—Buchanan Ingersoll & Rooney PC

(57) ABSTRACT

A brake apparatus for a vehicle controls braking force acting on front wheels by hydraulic braking force (front-wheel-side vacuum-booster hydraulic pressure fraction+linear-valve differential pressure fraction), which is frictional braking force, and regenerative braking force, and controls braking force acting on rear wheels by hydraulic braking force (rear-wheel-side vacuum-booster hydraulic pressure fraction) only, to thereby perform regeneration-coordinative brake control. During performance of ABS control, the apparatus sets the limit regenerative braking force to a force under which locking of the front wheels does not occur in a case in which the force acts on the front wheels, which are wheels undergoing regenerative braking, and adjusts the regenerative braking force such that the regenerative braking force does not exceed the limit regenerative braking force.

11 Claims, 11 Drawing Sheets

ENTIRE VEHICLE (ABS NOT OPERATED)

FRONT WHEEL SIDE (ABS NOT OPERATED)

BRAKE CONTROL APPARATUS FOR VEHICLE

BACKGROUND OF THE INVENTION

1. Field of the Invention

The present invention relates to a brake control apparatus for a vehicle.

2. Description of the Related Art

Recently, there has been developed a brake control technique which is applied to a motor-driven vehicle using a motor as a power source or a so-called hybrid vehicle using a motor and an internal combustion engine as a power source and which performs regeneration-coordinative brake control using braking force on the basis of hydraulic pressure (hydraulic braking force) as well as regenerative braking force generated by the motor.

More specifically, a brake apparatus for a vehicle which performs the above-described regeneration-coordinative brake control is generally designed to adjust the hydraulic braking force and the regenerative braking force in accordance with a force with which a brake pedal is operated (brake pedal depressing force) such that the characteristic of total braking force (entire braking force acting on the vehicle), which is the sum of the hydraulic braking force and the regenerative braking force, with respect to the brake pedal depressing force coincides with a preset target characteristic.

With this control, the characteristic of the total braking force with the brake pedal depressing force coincides with the preset target characteristic, and therefore, a driver does not receive an unnatural sensation at braking. In addition, during a period in which the driver decelerates the vehicle through operation of the brake pedal, electrical energy which is generated by the motor in accordance with the regenerative braking force of the motor can be collected in a battery, whereby the energy efficiency of the entire apparatus can be increased, and fuel consumption of the vehicle can be reduced.

In addition, a brake apparatus for a vehicle (antilock control apparatus for an electric automobile) described in Japanese Patent Application Laid-Open (kokai) No. H6-171489 is designed to further perform a known antiskid control operation (hereinafter called "ABS control") when a wheel tends to lock during a period in which the brake pedal is being operated (and accordingly, the above-mentioned regeneration-coordinative brake control is being executed), so as to further adjust the hydraulic braking force acting on the wheel (decrease the hydraulic braking force in accordance with a predetermined pattern) to thereby prevent the wheel from locking.

Here, there will be considered a case where ABS control is performed for a wheel which is receiving regenerative braking force during performance of the regeneration-coordinative brake control (hereinafter called a "wheel undergoing regenerative braking"). In this case, if the regenerative braking force exerted on a wheel which undergoes ABS control during performance of ABS control (hereinafter called a "wheel undergoing ABS control") is large, in some cases, locking of the wheel undergoing ABS control cannot be properly suppressed through only adjustment of the hydraulic braking force by the ABS control.

In other words, if a regenerative braking force is acting on a wheel undergoing ABS control during performance of ABS control, the regenerative braking force may adversely influence the ABS control. In view of the above, the apparatus disclosed in the publication is designed to adjust regenerative braking force to zero when ABS control is started and performed.

However, when the regenerative braking force is adjusted to zero, the quantity of electrical energy generated by the motor also becomes zero. Accordingly, adjusting the regenerative braking force to zero means that no electrical energy is collected in the battery at all during performance of ABS control. Accordingly, from the viewpoint of improving energy efficiency, it is preferred that even during performance of ABS control, regenerative braking force is generated within a range in which the regenerative braking force does not adversely influence the ABS control.

SUMMARY OF THE INVENTION

The present invention has been accomplished in order to cope with the above-described drawback, and an object of the present invention is to provide a brake control apparatus for a vehicle which performs regeneration-coordinative brake control using frictional braking force, such as hydraulic braking force, and regenerative braking force, as well as ABS control, and which can improve energy efficiency without adversely influencing the ABS control.

A brake apparatus for a vehicle to which the brake control apparatus for a vehicle according to the present invention is applied is used in a vehicle (a motor-driven vehicle, a hybrid vehicle, etc.) which includes, as a power source, a motor(s) for driving a specific wheel(s) (that is, the above-described wheel undergoing regenerative braking). The specific wheel undergoing regenerative braking may be two front wheels, two rear wheels, or all the wheels (four wheels), which are driven by the single or plurality of motors mounted on the vehicle.

The brake apparatus for a vehicle includes frictional-braking-force control means for individually controlling frictional braking force acting on each wheel of the vehicle, independently of operation of a brake operation member by a driver; and regenerative-braking-force control means for controlling regenerative braking force which is generated by the motor and acts on the specific wheel.

The "frictional braking force acting on each wheel" controlled by the frictional-braking-force control means refers to frictional force which is generated on a rotary member (e.g., a disc rotor) rotating together with the wheel and brakes the wheel, when a friction member (e.g., brake pads) is pressed against the rotary member. Examples of the frictional braking force include hydraulic braking force in the case where hydraulic pressure within a wheel cylinder is used as a drive source for the above-mentioned friction member, and pneumatic braking force in the case where air pressure is used as a drive source for the above-mentioned friction member. In the case where the hydraulic braking force is employed as the frictional braking force, the frictional-braking-force control means generally includes a hydraulic pump for generating a hydraulic pressure higher than hydraulic pressure (master cylinder hydraulic pressure) corresponding to operation of the brake operation member, a plurality of solenoid valves or the like for adjusting the respective wheel-cylinder hydraulic pressures of the wheels.

The regenerative-braking-force control means includes an inverter or the like which controls AC power supplied to, for example, an AC synchronous motor serving as a power source of the vehicle (accordingly, controls drive torque of the motor) and controls AC power generated by the motor when operating as a generator (accordingly, controls resistance produced upon generation of electrical power (hereinafter referred to as "power generation resistance"); i.e., regenerative braking force).

The brake control apparatus for a vehicle according to the present invention performs the above-described regeneration-coordinative brake control. That is, the apparatus includes regeneration-coordinative brake control means for adjusting a ratio between the frictional braking force and the regenerative braking force in accordance with operation of the brake operation member by means of controlling the frictional-braking-force control means and the regenerative-braking-force control means such that the characteristic of the total braking force (entire braking force acting on the vehicle), which is the sum of the frictional braking force and the regenerative braking force, with respect to the operation of the brake operation member (e.g., the above-mentioned brake pedal depressing force) coincides with a preset target characteristic.

The brake control apparatus for a vehicle according to the present invention further performs ABS control. That is, the present apparatus includes antiskid control means for performing ABS control for each wheel, when the wheel (wheel undergoing ABS control) tends to lock during operation of the brake operation member by the driver, so as to cause the frictional-braking-force control means to further adjust the frictional braking force adjusted by means of the regeneration-coordinative brake control means and acting on the wheel, to thereby suppress occurrence of locking of the wheel.

Specifically, when hydraulic braking force is employed as the frictional braking force, the antiskid control means controls the solenoid valves contained in the frictional-braking-force control means so as to adjust the wheel-cylinder hydraulic pressure of the wheel undergoing ABS control to a hydraulic pressure lower than the hydraulic pressure to which the wheel-cylinder hydraulic pressure is adjusted by the regeneration-coordinative brake control means, to thereby suppress occurrence of locking of the wheel undergoing ABS control.

The brake control apparatus for a vehicle according to the present invention is characterized by comprising limit-regenerative-braking-force obtaining means for obtaining, as limit regenerative braking force, a force which is greater than zero and under which locking of the specific wheel does not occur in a case in which the force acts on the specific wheel (or a force which is greater than zero and under which locking of the specific wheel does not occur under the assumption that the force acts solely on the specific wheel) and regenerative-braking-force adjustment means for causing the regeneration-coordinative brake control means to adjust the regenerative braking force such that the regenerative braking force does not exceed the limit regenerative braking force, when the ABS control is performed for the specific wheel (that is, the wheel undergoing regenerative braking).

By virtue of this configuration, when the ABS control is performed for the wheel undergoing regenerative braking (in the case where a plurality of wheels undergo regenerative braking, a portion or all of the wheels), the proportion of the regenerative braking force is adjusted such that the regenerative braking force does not exceed the limit regenerative braking force.

That is, in the case where the regenerative braking force—which is adjusted by means of the regeneration-coordinative brake control in accordance with operation of the brake operation member—does not exceed the limit regenerative braking force, the regenerative braking force and the frictional braking force, for example, are not changed and are maintained at the values to which they have been adjusted by means of the regeneration-coordinative brake control in accordance with operation of the brake operation member.

Meanwhile, in the case where the regenerative braking force—which is adjusted by means of the regeneration-coordinative brake control in accordance with operation of the brake operation member—exceeds the limit regenerative braking force, the regenerative braking force, for example, is reduced to a value equal to the limit regenerative braking force (or a smaller value). In addition, the frictional braking force adjusted by the regeneration-coordinative brake control means is increased by an amount by which the regenerative braking force is decreased. The ABS control is performed for only the frictional braking force fraction of the braking force (the sum of the frictional braking force and the regenerative braking force not greater than the limit regenerative braking force), which acts on the wheel undergoing regenerative braking and ABS control.

Here, the limit regenerative braking force is a force (>0) under which locking of the specific wheel (wheel undergoing regenerative braking) does not occur in a case in which the force acts on the specific wheel (or a force (>0) under which locking of the specific wheel (wheel undergoing regenerative braking) does not occur under the assumption that the force acts solely on the specific wheel). That is, the limit regenerative braking force is a small force so that even when the force is applied to the wheel undergoing regenerative braking and ABS control, the force does not adversely influence the ABS control.

Accordingly, even in the case where the sum of the frictional braking force and the regenerative braking force (>0) not greater than the limit regenerative braking force is applied to the wheel undergoing ABS control, and the ABS control is performed for the frictional braking force fraction, the above-described problem of failure in suppressing locking of the wheel undergoing ABS control does not occur. In other words, even when the ABS control is being performed, the regenerative braking force is generated to an extent such that the regenerative braking force does not adversely influence the ABS control and some electrical energy can be collected into the battery. As a result, it becomes possible to improve the energy efficiency during performance of the ABS control, without adversely influencing the ABS control.

In the brake control apparatus for a vehicle according to the present invention, preferably, the brake apparatus further includes road-surface-frictional-coefficient obtaining means for obtaining a road-surface frictional coefficient, which is the coefficient of friction between a road surface on which the vehicle travels and the tires of the vehicle; and the limit-regenerative-braking-force obtaining means changes the limit regenerative braking force in accordance with the road-surface frictional coefficient.

The road-surface frictional coefficient can be obtained, for example, by dividing, by gravitational acceleration, vehicle body deceleration obtained during performance of the ABS control or at the time of start of the ABS control. The vehicle body deceleration can be detected by use of, for example, an acceleration sensor which measures acceleration of the vehicle body in the front-rear direction thereof. Alternatively, the vehicle body deceleration can be obtained through time-differentiation of vehicle body speed obtained from the respective wheel speeds.

The higher the road-surface frictional coefficient, the higher the upper limit of braking force under which locking of the specific wheel does not occur under the assumption that the force acts on the wheel. Accordingly, the limit regenerative braking force can be increased with the road-surface frictional coefficient. Further, the greater the limit regenerative braking force, the greater the regenerative braking force produced during performance of the ABS control. As a result, energy efficiency can be further improved.

As can be understood from the above, through employment of the above-described configuration for changing the limit regenerative braking force in accordance with the road-surface frictional coefficient, the limit regenerative braking force can be increased with the road-surface frictional coefficient, whereby the energy efficiency during performance of the ABS control can be further improved.

In this case, preferably, the limit-regenerative-braking-force obtaining means determines the limit regenerative braking force on the basis of load acting on the specific wheel and the road-surface frictional coefficient. In general, the maximum value of force which can be generated by means of friction between a wheel (tire) and a road surface and which decelerates the vehicle body can be obtained by multiplying load acting on the wheel (tire) by the road-surface frictional coefficient.

In other words, the value obtained by multiplying load acting on the wheel (tire) by the road-surface frictional coefficient coincides with the upper limit of braking force acting on the wheel, under which limit locking of the wheel does not occur. Accordingly, when the limit-regenerative-braking-force obtaining means has the above-described configuration, through setting the limit regenerative braking force to the value obtained by multiplying load acting on the specific wheel by the road-surface frictional coefficient, the limit regenerative braking force can be increased to a possible extent within a range in which the ABS control is not adversely influenced. As a result, the energy efficiency during performance of the ABS control can be improved to the greatest possible extent.

Preferably, a value representing load which is determined in consideration of a variation in load stemming from deceleration of the vehicle is used as the "load acting on the specific wheel." For example, when the vehicle travels straight ahead while decelerating, an inertial force stemming from the deceleration acts on the vehicle body toward the front thereof. As a result, the load acting on the front wheels increases by an amount corresponding to the inertial force, and the load acting on the rear wheels decreases by an amount corresponding to the inertial force. That is, when the vehicle decelerates, the loads acting on the wheels change.

As can be understood from the above, when a value representing load determined in consideration of a variation in load stemming from deceleration of the vehicle is used as the "load acting on the specific wheel," the "load acting on the specific wheel" during performance of the ABS control (accordingly, during deceleration of the vehicle) can be represented more accurately. Accordingly, in the case where the limit-regenerative-braking-force obtaining means is configured to set the limit regenerative braking force to the value obtained by multiplying the "load acting on the specific wheel" by the road-surface frictional coefficient, the limit regenerative braking force, which has the highest possible value within a range in which the regenerative braking force does not adversely influence the ABS control, can be obtained more accurately.

Incidentally, in general, the maximum value of regenerative braking force which is permitted to be generated (allowable maximum regenerative braking force) changes depending on the conditions of the vehicle such as the state of charging of the battery and the rotational speed of the motor (that is, the vehicle body speed). Preferably, during performance of the regeneration-coordinative brake control, the regenerative braking force is controlled so as not to exceed the allowable maximum regenerative braking force, irrespective of whether the ABS control is being performed for the wheel undergoing regenerative braking.

Accordingly, preferably, the brake control apparatus for a vehicle according to the present invention further comprises allowable-maximum-regenerative-braking-force determination means for determining an allowable maximum regenerative braking force, which is the maximum value of regenerative braking force which is permitted to be generated, in accordance with conditions of the vehicle; the regeneration-coordinative brake control means adjusts the frictional braking force and the regenerative braking force in accordance with operation of the brake operation member such that the regenerative braking force does not exceed the allowable maximum regenerative braking force; and the regenerative-braking-force adjustment means causes the regeneration-coordinative brake control means to adjust the regenerative braking force such that the regenerative braking force does not exceed the smaller value of the limit regenerative braking force and the allowable maximum regenerative braking force, when the ABS control is performed for the specific wheel.

In the brake control apparatus for a vehicle according to the present invention, the regenerative-braking-force adjustment means causes the regeneration-coordinative brake control means to adjust the regenerative braking force such that the regenerative braking force does not exceed the limit regenerative braking force, even when the ABS control is performed only for wheels other than the specific wheel.

The braking force acting on the wheels other than the specific wheel (wheel undergoing regenerative braking) is composed of only frictional braking force. Accordingly, when the ABS control is performed only for the wheels other than the specific wheel, the regenerative braking force does not adversely influence the ABS control. Therefore, the regenerative braking force is not necessarily required to be limited to the limit regenerative braking force or less.

However, in a situation where the ABS control is performed only for the wheels other than the specific wheel, conceivably, the ABS control is highly likely to be started for the specific wheel immediately thereafter. Meanwhile, even when the control of limiting the regenerative braking force to the limit regenerative braking force or less is started immediately after start of the ABS control for the specific wheel, because of control delay, delay of the regenerative braking force control means (inverter, etc.), or other causes, the regenerative braking force may become greater than the limit regenerative braking force over a short period of time after the start of the ABS control for the specific wheel. In such a case, the regenerative braking force may adversely influence the ABS control for the specific wheel over such a short period of time.

As can be understood from the above, when, as in the above-described configuration, the regenerative braking force is limited in advance to the limit regenerative braking force or less during a stage in which the ABS control is performed only for wheels other than the specific wheel, it becomes possible to reliably eliminate adverse influences of the regenerative braking force on the ABS control performed for the specific wheel, which adverse influences would otherwise arise when the ABS control for the specific wheel is started later on.

In the case where hydraulic braking force is employed as the frictional braking force, preferably, the brake apparatus to which the brake control apparatus of the present invention is applied comprises base-hydraulic-pressure generation means for generating a base hydraulic pressure corresponding to operation of the brake operation member by the driver; pressure addition means for generating pressure-adding hydraulic pressure for generating a hydraulic pressure higher than the base hydraulic pressure; pressure adjustment means for adjusting a pressure added to the base hydraulic pressure while utilizing the pressure-adding hydraulic pressure generated by the pressure addition means; and regenerative braking force control means for controlling the regenerative braking force generated by the motor.

The base-hydraulic-pressure generation means includes a master cylinder or the like which generates the base hydraulic pressure (master cylinder hydraulic pressure, vacuum booster hydraulic pressure) through action of a boosting apparatus (vacuum booster or the like) in accordance with operation of the brake operation member by the driver. The pressure addition means includes a hydraulic pump (gear pump or the like) which discharges brake fluid into a hydraulic circuit capable of generating wheel-cylinder hydraulic pressure.

The pressure adjustment means includes a (normally-open-type or normally-closed-type) linear solenoid valve or the like interposed between a hydraulic circuit which generates the base hydraulic pressure and the hydraulic circuit capable of generating wheel-cylinder hydraulic pressure. The linear solenoid valve is controlled while utilizing the pressure-adding hydraulic pressure generated by the hydraulic pump, whereby the pressure (differential pressure) added to the base hydraulic pressure (that is, the value obtained by subtracting the base hydraulic pressure from the wheel-cylinder hydraulic pressure) can be adjusted seamlessly. As a result, the wheel-cylinder hydraulic pressure can be adjusted seamlessly, independently of the base hydraulic pressure (accordingly, operation of the brake operation member).

In this case, preferably, the regeneration-coordinative brake control means is configured to perform regeneration-coordinative brake control, while adjusting a compensation braking force in accordance with operation of the brake operation member such that the characteristic of the total braking force (entire braking force acting on the vehicle), which is the sum of a base-hydraulic braking force and the compensation braking force, with respect to the operation of the brake operation member coincides with a preset target characteristic, wherein the base-hydraulic braking force is hydraulic braking force based on the base hydraulic pressure generated by the base-hydraulic-pressure generation means; and the compensation braking force is composed of the regenerative braking force generated by the regenerative braking force control means and/or hydraulic braking force based on the added pressure adjusted by the pressure adjustment means (the amount of increase in the hydraulic braking force corresponding to the added pressure; that is, the above-described added-pressure hydraulic braking force).

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

A brake apparatus (brake control apparatus) for a vehicle according to an embodiment of the present invention will be described with reference to the drawings.

Figure 1:
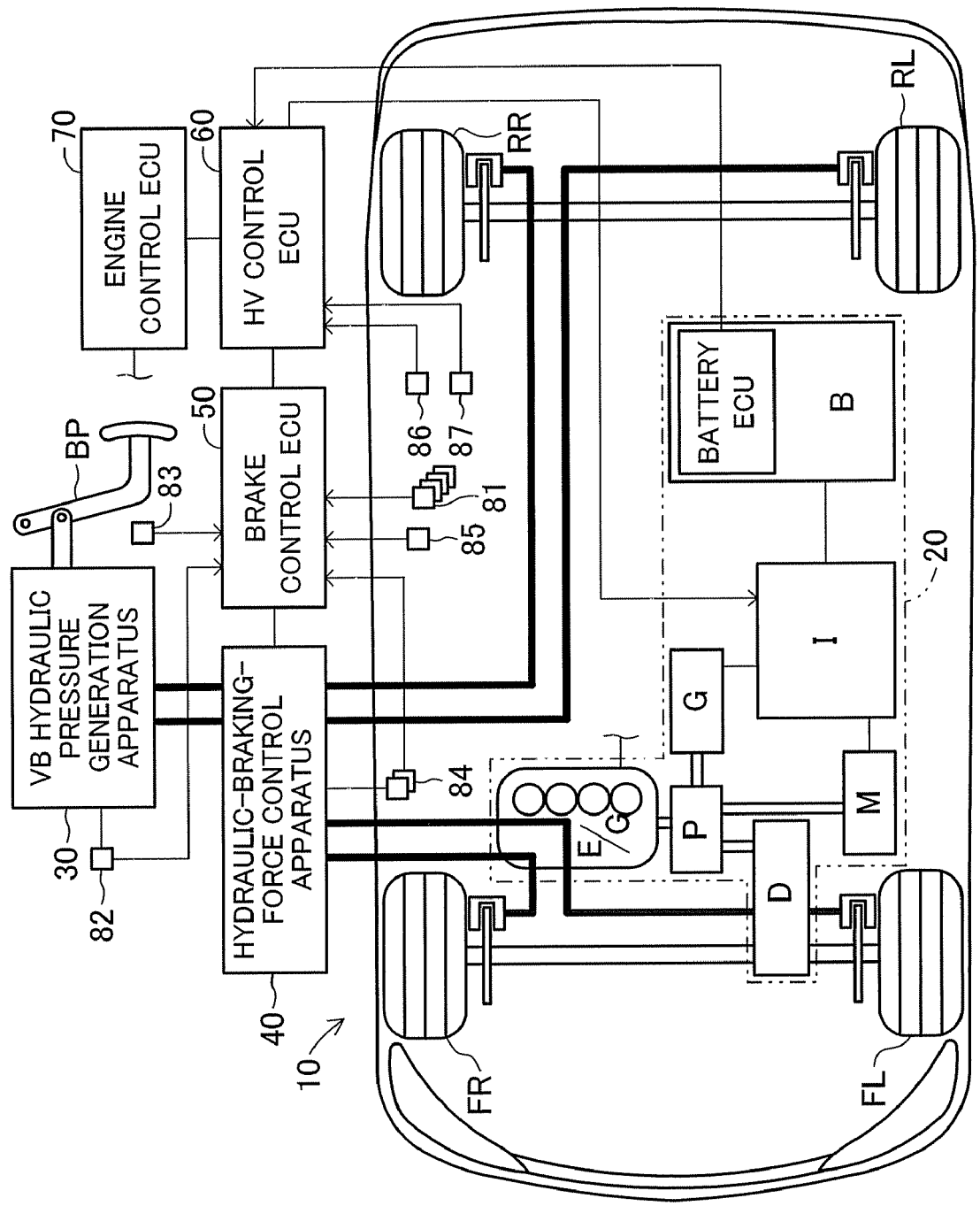
FIG. 1 is a schematic diagram of a vehicle equipped with a brake apparatus for a vehicle according to an embodiment of the present invention.

FIG. 1 schematically shows the structure of a vehicle equipped with a brake apparatus 10 according to the embodiment of the present invention. The illustrated vehicle is a so-called hybrid vehicle of a front-wheel drive type which uses an engine and a motor as a drive source for driving the front wheels and which includes two brake hydraulic circuits (that is, front-rear piping system); i.e., a system for the two front wheels and a system for the two rear wheels. The two front wheels correspond to "specific wheels."

This brake apparatus 10 includes a hybrid system 20 having two types of power sources; i.e., an engine E/G and a motor M; a vacuum-booster hydraulic pressure generation apparatus (hereinafter called the "VB hydraulic pressure generation apparatus") 30 which generates brake hydraulic pressure in accordance with brake pedal operation by a driver; a hydraulic-braking-force control apparatus 40 which controls hydraulic braking forces (specifically, wheel-cylinder hydraulic pressures) of the wheels; a brake control ECU 50; a hybrid control ECU (hereinafter called "HV control ECU") 60; and an engine control ECU 70.

The hybrid system 20 includes the engine E/G, the motor M, a generator G, a power division mechanism P, a reduction unit D, an inverter I, and a battery B. The engine E/G is the main power source of the vehicle, and in the present embodiment is a spark-ignition, multi-cylinder (four-cylinder) internal combustion engine.

The motor M is an auxiliary power source of the engine E/G, and is an AC synchronous motor which also serves a generator for generating regenerative braking force when the driver operates a brake pedal BP. The generator G is an AC synchronous motor as in the case of the motor M. The generator G is driven by the engine E/G, and generates AC power (AC current) for charging of the battery B or drive of the motor M.

The power division mechanism P is formed of a so-called planetary gear mechanism and is connected to the engine E/G, the motor M, the generator G, and the reduction unit D. The power division mechanism P switches the power transmission path (and direction). That is, the power division mechanism P can transmit the drive torque of the engine E/G and the drive torque of the motor M to the reduction unit D. Thus, these drive torques are transmitted to the front wheels via the reduction unit D and an unillustrated front-wheel-side power transmission system, whereby the front wheels are driven.

Further, the power division mechanism P can transmit the drive torque of the engine E/G to the generator G, whereby the generator G is driven. Moreover, when the brake pedal BP is being operated, the power division mechanism P can transmit power from the reduction unit D (that is, the front wheels (driven wheels)) to the motor M. Thus, the motor M is driven to function as a generator for generating regenerative braking force.

The inverter I is connected to the motor M, the generator G, and the battery B. The inverter I receives DC power (high voltage DC current) supplied from the battery B, converts it to AC power (AC current) for motor drive, and supplies the AC power to the motor M. Thus, the motor M is driven. Further, the inverter I receives AC power generated by the generator G, converts it to AC power for motor drive, and supplies the AC power to the motor M. With this operation as well, the motor M is driven.

Furthermore, the inverter I can convert the AC power generated by the generator G to DC power, and supply the DC power to the battery B. With this operation, the battery B can be charged when the value of a parameter indicating the state of charge (hereinafter called "SOC") of the battery B is low.

Moreover, the inverter I can receive AC power generated by the motor M which is driven as a generator (which is generating regenerative braking force) upon operation of the brake pedal BP, convert it to DC power, and supply the DC power to the battery B. With this operation, kinetic energy of the vehicle can be converted to electric energy, and this electric energy can be collected (charged) in the battery B. In this case, the greater the power generation resistance (regenerative braking force) produced by the motor M, the greater the amount of power to be charged into the battery B.

Figure 2:
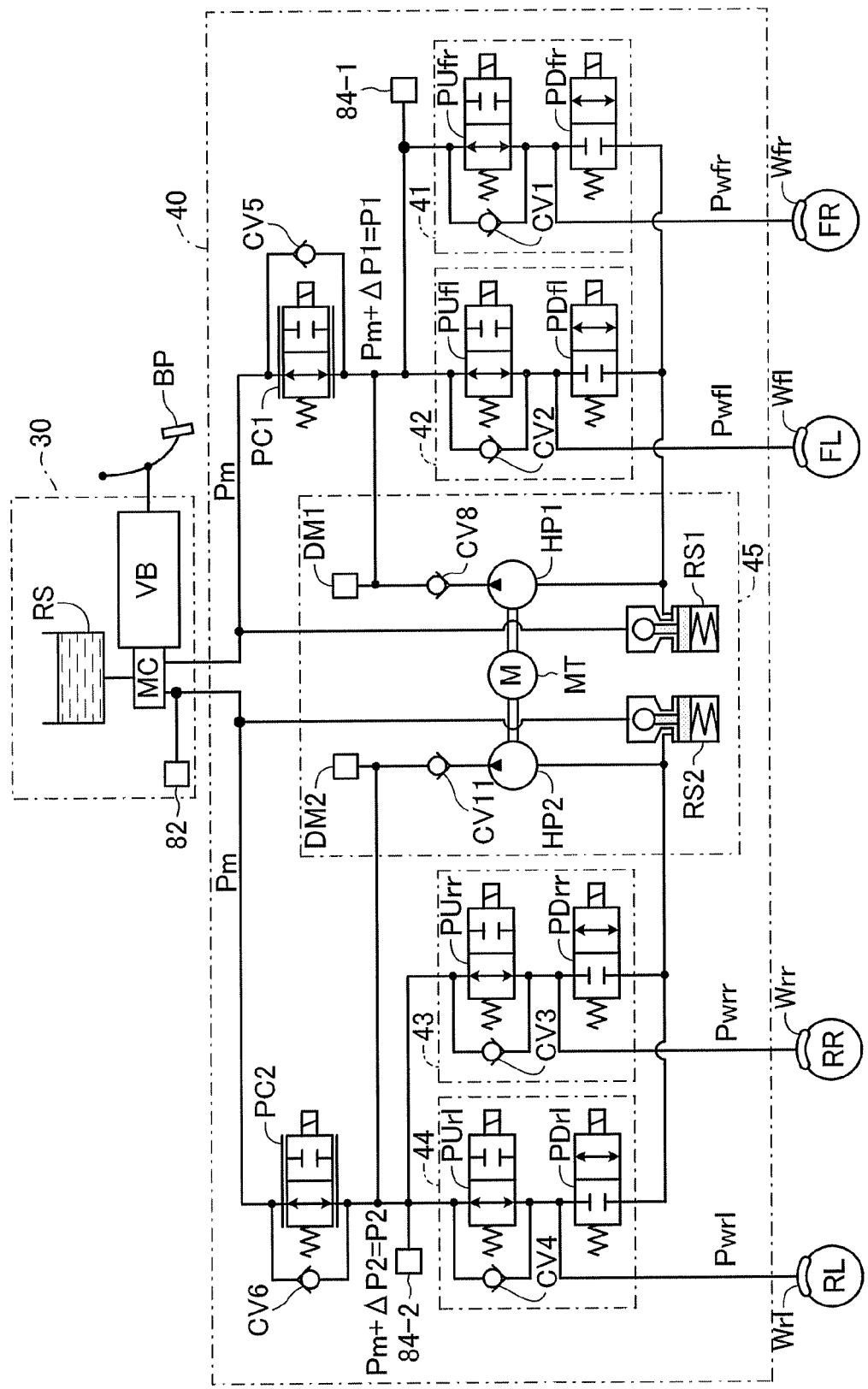
FIG. 2 is a schematic diagram of the vacuum-booster hydraulic pressure generation apparatus and the hydraulic braking force control apparatus shown in FIG. 1.

As schematically shown in FIG. 2, the VB hydraulic pressure generation apparatus 30 includes a vacuum booster VB which operates in response to operation of the brake pedal BP, and a master cylinder MC which is linked to the vacuum booster VB. The vacuum booster VB utilizes the pressure (negative pressure) of air within the intake pipe of the engine E/G so as to boost the operating force of the brake pedal BP by a prescribed ratio and transmits the boosted operating force to the master cylinder MC.

The master cylinder MC has two output ports; i.e., a first port which belongs to the system for the front wheels FR and FL, a second port which belongs to the system for the rear wheels RR and RL. The master cylinder MC receives brake fluid from a reservoir RS, and generates from the first port a first VB hydraulic pressure Pm (base hydraulic pressure) corresponding to the boosted operating force. The master cylinder MC also generates from the second port a second VB hydraulic pressure Pm (base hydraulic pressure) which is substantially the same as the first VB hydraulic pressure.

The structures and operations of the master cylinder MC and the vacuum booster VB are well known, and therefore detailed explanations thereof are omitted. In this manner, the master cylinder MC and the vacuum booster VB generate the first and second VB hydraulic pressures (base hydraulic pressures) corresponding to the operating force of the brake pedal BP. The VB hydraulic pressure generation apparatus 30 corresponds to the base-hydraulic-pressure generation means.

As schematically shown in FIG. 2, the hydraulic-braking-force control apparatus 40 includes an FR brake hydraulic pressure adjusting section 41, an FL brake hydraulic pressure adjusting section 42, an RR brake hydraulic pressure adjusting section 43, and an RL brake hydraulic pressure adjusting section 44, which can adjust the brake hydraulic pressures supplied to corresponding wheel cylinders Wfr, Wfl, Wrr, and Wrl respectively installed on the wheels FR, FL, RR, and RL; and a return brake fluid supply section 45.

A normally-open linear solenoid valve PC1, serving as pressure adjustment means, is interposed between the first port of the master cylinder MC and the upstream side of the FR brake hydraulic pressure adjusting section 41 and the upstream side of the FL brake hydraulic pressure adjusting section 42. Similarly, a normally-open linear solenoid valve PC2, serving as pressure adjustment means, is interposed between the second port of the master cylinder MC, and the upstream side of the RR brake hydraulic pressure adjusting section 43 and the upstream side of the RL brake hydraulic pressure adjusting section 44. The normally-open linear solenoid valves PC1 and PC2 will be described in detail later.

The FR brake hydraulic pressure adjusting section 41 consists of a pressure-increasing valve PUfr, which is a normally-open solenoid valve of a 2-port, 2-position type, and a pressure-reducing valve PDfr, which is a normally-closed solenoid valve of a 2-port, 2-position type. The pressure-increasing valve PUfr establishes and breaks communication between the upstream side of the FR brake hydraulic pressure adjusting section 41 and the wheel cylinder Wfr. The pressure-reducing valve PDfr establishes and breaks communication between the wheel cylinder Wfr and a reservoir RS1. Therefore, through control of the pressure-increasing valve PUfr and the pressure-reducing valve PDfr, the brake hydraulic pressure within the wheel cylinder Wfr (wheel cylinder pressure Pwfr) can be increased, maintained, and reduced.

In addition, a check valve CV1 which allows flow of the brake fluid in only one direction from the wheel cylinder Wfr side to the upstream side of the FR brake hydraulic pressure adjusting section 41 is connected in parallel with the pressure-increasing valve PUfr. As a result, when the brake pedal BP is released after being operated, the wheel cylinder pressure Pwfr is rapidly decreased.

Similarly, the FL brake hydraulic pressure adjusting section 42, the RR brake hydraulic pressure adjusting section 43, and the RL brake hydraulic pressure adjusting section 44 comprise a pressure-increasing valve PUfl and a pressure-reducing valve PDfl, a pressure-increasing valve PUrr and a pressure-reducing valve PDrr, and a pressure-increasing valve PUrl and a pressure-reducing valve PDrl, respectively. Through control of each pressure-increasing valve and pressure-reducing valve, the brake hydraulic pressure in the wheel cylinder Wfl, the wheel cylinder Wrr, and the wheel cylinder Wrl (wheel cylinder pressures Pwfl, Pwrr, Pwrl) can be increased, maintained, or decreased. Check valves CV2, CV3, and CV4 are provided in parallel with the pressure-increasing valves PUfl, PUrr, and PUrl, respectively, to provide the same function as that of the check valve CV1.

The return brake fluid supply section 45 includes a DC motor MT, and two hydraulic pumps (gear pumps) HP1 and HP2 simultaneously driven by the motor MT. The hydraulic pump HP1 pumps the brake fluid returned from the pressure reducing values PDfr and PDfl to the reservoir RS1, and supplies the pumped brake fluid to the upstream sides of the FR brake hydraulic pressure adjusting section 41 and the FL brake hydraulic pressure adjusting section 42 via a check valve CV8.

Similarly, the hydraulic pump HP2 pumps the brake fluid returned from the pressure reducing values PDrr and PDrl to a reservoir RS2, and supplies the pumped brake fluid to the upstream sides of the RR brake hydraulic pressure adjusting section 43 and the RL brake hydraulic pressure adjusting section 44 via a check valve CV11. Notably, in order to reduce pulsation of discharge pressures of the hydraulic pumps HP1 and HP2, a damper DM1 is disposed in a hydraulic circuit between the check valve CV8 and the normally-open linear solenoid valve PC1, and a damper DM2 is disposed in a hydraulic circuit between the check valve CV11 and the normally-open linear solenoid valve PC2.

Next, the normally-open linear solenoid valve PC1 (pressure adjustment means) will be described. The valve body of the normally-open linear solenoid valve PC1 always receives force in the opening direction stemming from urging force of an unillustrated coil spring, and also receives force in the opening direction stemming from the differential pressure obtained through subtraction of the first VB hydraulic pressure Pm from the pressure at the upstream side of the FR brake hydraulic pressure adjusting section 41 and the FL brake hydraulic pressure adjusting section 42 (pressure added to the base hydraulic pressure; hereinafter may be simply referred to as "linear-valve differential pressure $\Delta P1$") and force in the closing direction stemming from attraction force which increases in proportion to current supplied to the normally-open linear solenoid valve PC1 (i.e., instruction current Id).

Figure 3:
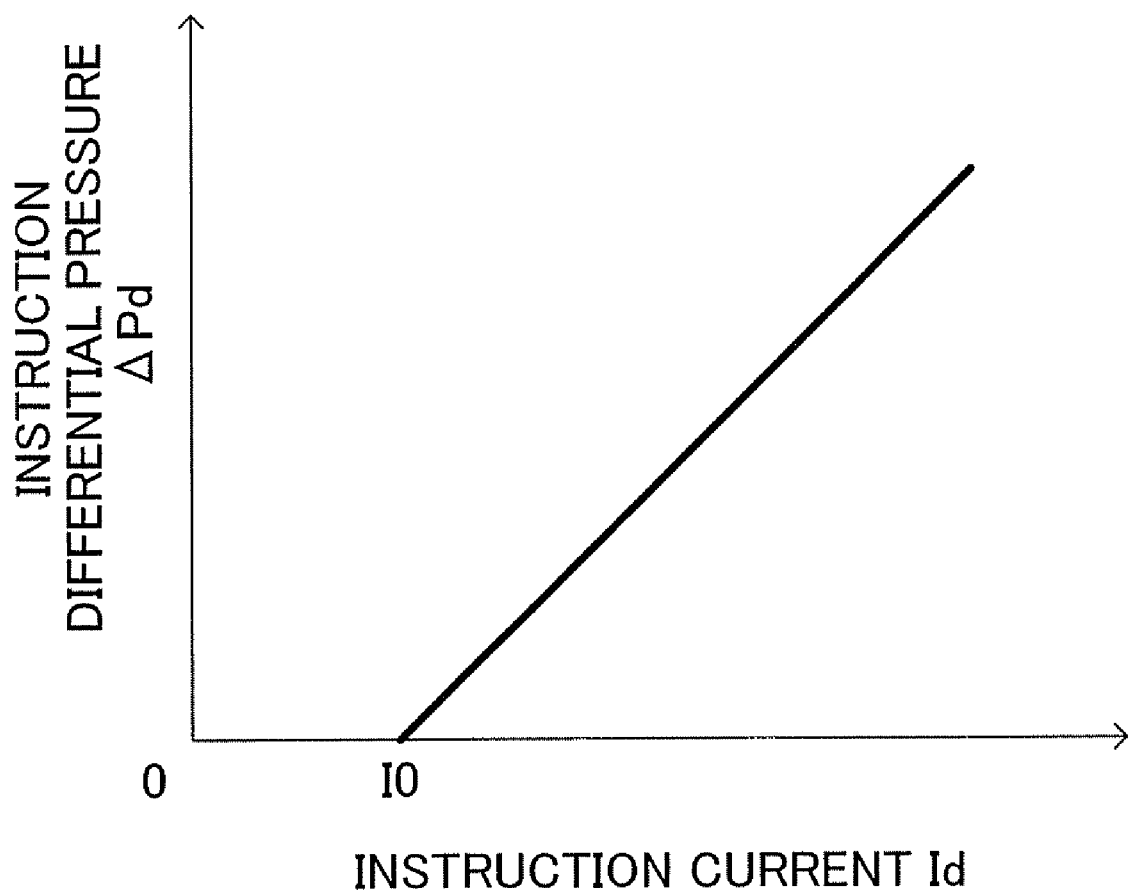
FIG. 3 is a graph showing the relation between instruction current and instruction differential pressure regarding a normally-open linear solenoid valve shown in FIG. 2.

As a result, as shown in FIG. 3, instruction differential pressure $\Delta Pd$ corresponding to the attraction force is determined such that it increases in proportion to the instruction current Id. In FIG. 3, 10 represents a current value corresponding to the urging force of the coil spring. When the instruction differential pressure $\Delta Pd$ (specifically, front-wheel-side instruction differential pressure $\Delta Pdf$) is greater than the linear-valve differential pressure $\Delta P1$, the normally-open linear solenoid valve PC1 closes so as to break the communication between the first port of the master cylinder MC, and the upstream portion of the FR brake hydraulic pressure adjusting section 41 and the upstream portion of the FL brake hydraulic pressure adjusting section 42.

Meanwhile, when the front-wheel-side instruction differential pressure $\Delta Pdf$ is less than the linear-valve differential pressure $\Delta P1$, the normally-open linear solenoid valve PC1 opens so as to establish the communication between the first port of the master cylinder MC, and the upstream portion of the FR brake hydraulic pressure adjusting section 41 and the upstream portion of the FL brake hydraulic pressure adjusting section 42. As a result, the brake fluid at the upstream portion of the FR brake hydraulic pressure adjusting section 41 and the upstream portion of the FL brake hydraulic pressure adjusting section 42 (supplied from the hydraulic pump HP1) flows toward the first port of the master cylinder MC via the normally-open linear solenoid valve PC1, whereby the linear-valve differential pressure $\Delta P1$ is adjusted to coincide with the front-wheel-side instruction differential pressure $\Delta Pdf$. Notably, the brake fluid flowing into the first port of the master cylinder MC is returned to the reservoir RS1.

In other words, when the motor MT (accordingly, the hydraulic pumps HP1 and HP2) is driven, the linear-valve differential pressure $\Delta P1$ (its allowable maximum value) can be controlled in accordance with the instruction current Id (Idf) of the normally-open linear solenoid valve PC1. At that time, the pressure on the upstream side of the FR brake hydraulic pressure adjusting section 41 and the FL brake hydraulic pressure adjusting section 42 becomes equal to the sum (Pm+$\Delta P1$) of the first VB hydraulic pressure Pm and the linear-valve differential pressure $\Delta P1$ (the sum may be called the "control hydraulic pressure P1").

Meanwhile, when the normally-open linear solenoid valve PC1 is brought into an unexcited state (i.e., when the instruction current Idf is set to zero), the normally-open linear solenoid valve PC1 maintains its open state because of urging force of the coil spring. At this time, the linear-valve differential pressure $\Delta P1$ becomes zero, and the pressure (that is, the control hydraulic pressure P1) on the upstream side of the FR brake hydraulic pressure adjusting section 41 and the FL brake hydraulic pressure adjusting section 42 becomes equal to the first VB hydraulic pressure Pm.

The normally-open linear solenoid valve PC2 is the same as the normally-open linear solenoid valve PC1 in terms of structure and operation. Here, the differential pressure obtained through subtraction of the second VB hydraulic pressure Pm from the pressure at the upstream side of the RR brake hydraulic pressure adjusting section 43 and the RL brake hydraulic pressure adjusting section 44 (pressure added to the base hydraulic pressure) is referred to as "linear-valve differential pressure $\Delta P2$". In this case, when the motor MT (accordingly, the hydraulic pump HP1 and HP2) is driven, the pressure at the upstream side of the RR brake hydraulic pressure adjusting section 43 and the RL brake hydraulic pressure adjusting section 44 depends on the instruction current Id (Idr) supplied to the normally-open linear solenoid valve PC2, and becomes equal to the sum (Pm+$\Delta P2$) of the second VB hydraulic pressure Pm and the instruction differential pressure $\Delta Pd$ (specifically, the rear-wheel-side instruction differential pressure $\Delta Pdr$; that is, the linear-valve differential pressure $\Delta P2$) (the sum may be called the "control hydraulic pressure P2"). Meanwhile, when the normally-open linear solenoid valve PC2 is brought into a unexcited state, the pressure (the control hydraulic pressure P2) on the upstream side of the RR brake hydraulic pressure adjusting section 43 and the RL brake hydraulic pressure adjusting section 44 becomes equal to the second VB hydraulic pressure Pm.

In addition, a check valve CV5 which allows flow of the brake fluid in only one direction from the first port of the master cylinder MC to the upstream portion of the FR brake hydraulic pressure adjusting section 41 and the upstream portion of the FL brake hydraulic pressure adjusting section 42 is connected in parallel with the normally-open linear solenoid valve PC1. By virtue of this configuration, even during a period in which the linear-valve differential pressure $\Delta P1$ is controlled in accordance with the instruction current Idf supplied to the normally-open linear solenoid valve PC1, when, upon operation of the brake pedal BP, the first VB hydraulic pressure Pm becomes higher than the pressure on the upstream side of the FR brake hydraulic pressure adjusting section 41 and the upstream portion of the FL brake hydraulic pressure adjusting section 42, brake hydraulic pressure (i.e., the first VB hydraulic pressure Pm) corresponding to the operation force of the brake pedal BP is supplied to the wheel cylinders Wfr and Wfl. Further, a check valve CV6, which provides the same function as that of the check valve CV5, is connected in parallel with the normally-open linear solenoid valve PC2.

As described above, the hydraulic-braking-force control apparatus 40 is formed by means of a so-called front-rear piping system including a system for the two front wheels FR and FL and a system for the two rear wheels RR and RL. The hydraulic pressure control section 40 is configured such that when all the solenoid valves are in their unexcited states, brake hydraulic pressure (i.e., first and second VB hydraulic pressures Pm; base pressure) corresponding to the operation force of the brake pedal BP is supplied to the wheel cylinder W**.

Notably, the symbol "" appended to various variables and the like collectively represents the symbols fl, fr, rl, and rr and indicates that the particular variable or the like applies to all of the wheels FR, FL, etc. of the vehicle. For example, the wheel cylinder W collectively indicates the wheel cylinder Wfl for the front left wheel, the wheel cylinder Wfr for the front right wheel, the wheel cylinder Wrl for the rear left wheel, and the wheel cylinder Wrr for the rear right wheel.

Meanwhile, the hydraulic-braking-force control apparatus 40 is configured such that when the motor MT (accordingly, the hydraulic pumps HP1 and HP2) is driven and the normally-open linear solenoid valve PC1 is excited by an instruction current Idf in this state, the hydraulic-braking-force control apparatus 40 can supply to the wheel cylinders Wfr and Wfl brake hydraulic pressure (control hydraulic pressure P1) which is higher than the first VB hydraulic pressure Pm by a front-wheel-side instruction differential pressure ΔPdf (=ΔP1) determined in accordance with the instruction current Idf. Similarly, the hydraulic-braking-force control apparatus 40 can supply to the wheel cylinders Wrr and Wrl brake hydraulic pressure (control hydraulic pressure P2) which is higher than the second VB hydraulic pressure Pm by a rear-wheel-side instruction differential pressure ΔPdr (=ΔP2) determined in accordance with the instruction current Idr.

In addition, the hydraulic-braking-force control apparatus 40 is configured such that the wheel cylinder pressure Pw can be individually adjusted through control of the pressure-increasing valve PU and the pressure-reducing valve PD**. That is, the hydraulic-braking-force control apparatus 40 is configured to individually adjust the braking forces applied to the respective wheels independently of operation of the brake pedal BP by the driver.

Thus, in accordance with instructions from the brake control ECU 50, the hydraulic-braking-force control apparatus 40 can achieve, for example, not only ABS control to be described later, but also control operations which improve the stability of the vehicle, such as under-steer suppressing control, over-steer suppressing control, inter-vehicle distance control, etc.

Referring back to FIG. 1, each of the brake control ECU 50, the HV control ECU 60, the engine control ECU 70, and a battery ECU contained in the battery B is formed of a microcomputer which includes a CPU; ROM in which are previously stored programs to be executed by the CPU, tables (look-up tables and maps), constants, and the like; RAM in which the CPU temporarily stores data as necessary; backup RAM which stores data when the power supply is on and which maintains the stored data when the power supply is cut off; an interface containing A/D converters; and the like. The HV control ECU 60 is connected to each of the brake control ECU 50, the engine control ECU 70, and the battery ECU so as to perform CAN communications.

The brake control ECU 50 is connected to wheel speed sensors 81**, a VB hydraulic pressure sensor 82 (see FIG. 2), a brake-pedal depressing force sensor 83, and wheel-cylinder hydraulic pressure sensors 84 (84-1 and 84-2; see FIG. 2), and a front-rear acceleration sensor 85.

The wheel speed sensors 81fl, 81fr, 81rl, and 81rr are each formed of an electromagnetic pick-up-type sensor, and output signals having frequencies corresponding to the wheel speeds of the wheels FL, FR, RL, and RR. The VB hydraulic pressure sensor 82 detects the (second) VB hydraulic pressure, and outputs a signal indicating the VB hydraulic pressure Pm. The brake-pedal depressing force sensor 83 detects depressing force with which the driver depresses the brake pedal, and outputs a signal indicating the brake-pedal depressing force Fp. The wheel-cylinder hydraulic pressure sensors 84-1 and 84-2 detect the above-described control hydraulic pressures P1 and P2, respectively, and output signals indicating the control hydraulic pressures P1 and P2, respectively. The front-rear acceleration sensor 85 detects deceleration of the vehicle body in the front-rear direction of the vehicle body, and outputs a signal indicating the vehicle body deceleration Gx.

The brake control ECU 50 receives the signals from the sensors 81 to 85, and outputs drive signals to the solenoid valves and the motor MT of the hydraulic-braking-force control apparatus 40. Further, as will be described later, the brake control ECU 50 sends to the HV control ECU 60 a target regenerative braking force Fregt, which is a regenerative braking force to be generated in the present traveling condition in response to operation of the brake pedal BP.

The HV control ECU 60 is connected to an accelerator opening sensor 86 and a shift position sensor 87. The accelerator opening sensor 86 detects the amount of operation of an unillustrated accelerator pedal by the driver, and outputs a signal indicating the accelerator-pedal operation amount Accp. The shift position sensor 87 detects the shift position of an unillustrated shift lever, and outputs a signal indicating the shift position.

The HV control ECU 60 receives the signals from the sensors 86 and 87, and calculates, on the basis of these signals, a target output for the engine E/G and a target torque for the motor M, which match the traveling conditions. The HV control ECU 60 outputs the target output of the engine E/G to the engine control ECU 70. In response thereto, the engine control ECU 70 controls the opening of an unillustrated throttle valve on the basis of the target output of the engine E/G. As a result, the drive torque of the engine E/G is controlled.

Further, the HV control ECU 60 sends to the inverter I a signal for controlling the AC power supplied to the motor M on the basis of the target torque of the motor M. With this operation, the drive torque of the motor M is controlled.

Further, the HV control ECU 60 receives a signal indicating the above-mentioned SOC from the battery ECU. When the SOC has decreased, the HV control ECU 60 sends to the inverter I a signal for controlling the AC power generated by the generator G. With this operation, the AC power generated by the generator G is converted to DC power, and the battery B is charged.

Moreover, when the brake pedal BP is being operated, the HV control ECU 60 calculates an allowable maximum regenerative braking force Fregmax, which is the maximum value of regenerative braking force which is permitted at the present time, from the value of SOC, the vehicle body speed based on the output of the wheel speed sensor 81 (estimated vehicle body speed Vso to be described later), etc. The HV control ECU 60 calculates an actual regenerative braking force Fregact, which is a regenerative braking force to be generated actually, from the allowable maximum regenerative braking force Fregmax and the above-mentioned target regenerative braking force Fregt received from the brake control ECU 50**.

The HV control ECU 60 then outputs to the brake control ECU 50 a signal indicating the actual regenerative braking force Fregact, and outputs to the inverter I a signal for controlling the AC power supplied to the motor M on the basis of the actual regenerative braking force Fregact. With this operation, the regenerative braking force Freg produced by the motor M is controlled to coincide with the actual regenerative braking force Fregact. Means which controls the regenerative braking force in this manner corresponds to the regenerative braking force control mans.

Outline of Regeneration-coordinative Brake Control

Next, there will be described an outline of regeneration-coordinative brake control performed by the brake apparatus 10 according to the embodiment of the present invention having the above-described configuration (hereinafter referred to as the "present apparatus"). In general, a characteristic (target characteristic) is set for a vehicle in relation to the characteristic of total braking force acting on the vehicle with respect to brake pedal depressing force Fp.

Figure 4:
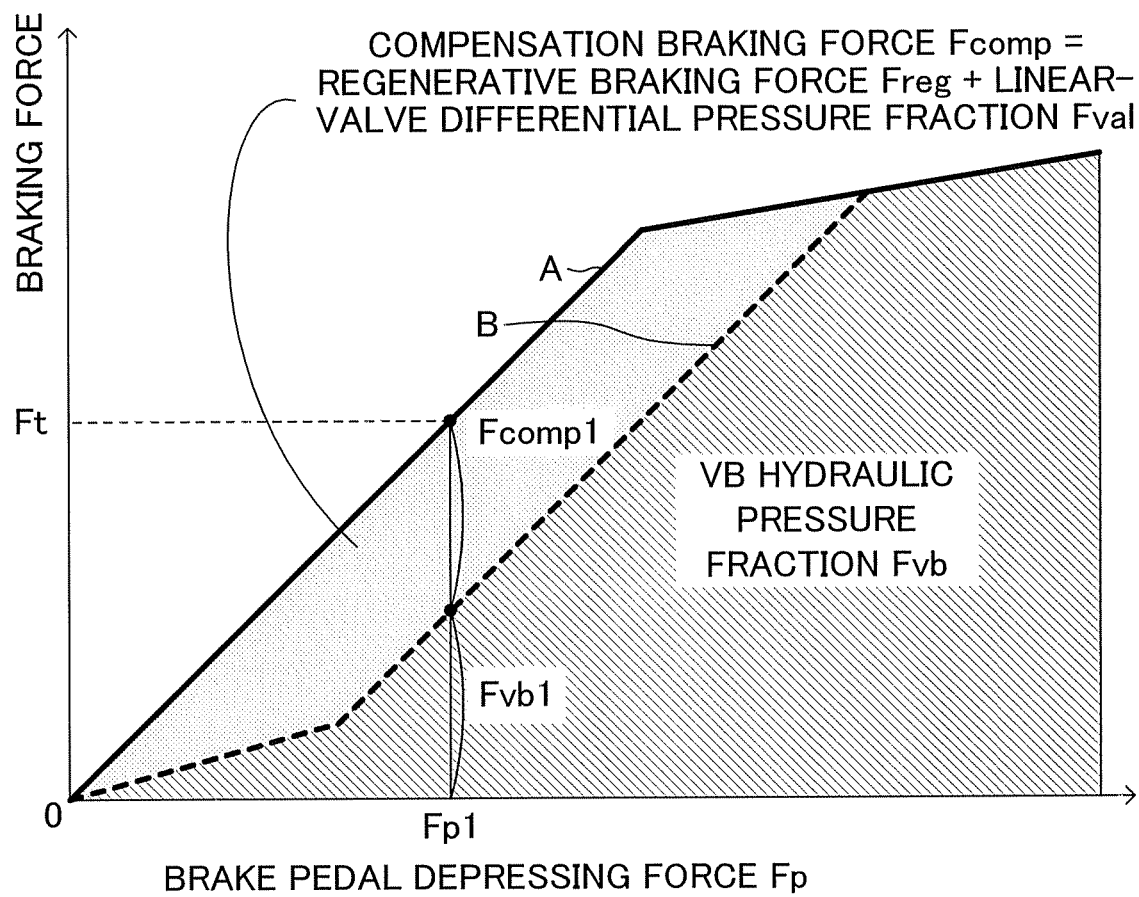
FIG. 4 is a graph showing the relation between brake pedal depressing force and hydraulic braking force based on vacuum-booster hydraulic pressure (VB hydraulic-pressure fraction) and a target characteristic of the total braking force with the brake pedal depressing force.

A solid line A shown in FIG. 4 shows a target characteristic of total braking force with respect to brake pedal depressing force Fp in the vehicle shown in FIG. 1. Meanwhile, a broken line B in FIG. 4 shows the characteristic of hydraulic braking force based on the above-described VB hydraulic pressure (specifically, first and second VB hydraulic pressures Pm) output from the master cylinder MC in the present apparatus (base hydraulic braking force; hereinafter referred as "VB hydraulic pressure fraction Fvb") with respect to brake pedal depressing force Fp.

As is apparent from comparison of the solid line A and the broken line B, the boosting characteristic of the vacuum booster VB is set such that a VB hydraulic pressure fraction Fvb corresponding to a brake pedal depressing force Fp becomes lower than the target value by a predetermined amount.

The present apparatus compensates for the shortage of the VB hydraulic pressure fraction Fvb with respect to the target value, by use of compensation braking force Fcomp, so that the characteristic of total braking force (=Fvb+Fcomp), which is the sum of the VB hydraulic pressure fraction Fvb and the compensation braking force Fcomp, with respect to brake pedal depressing force Fp coincides with the target characteristic indicated by the solid line A in FIG. 4.

The compensation braking force Fcomp is the sum of the above-mentioned regenerative braking force Freg generated by the motor M and the linear-valve differential pressure fraction Fval (added hydraulic braking force). The linear-valve differential pressure fraction Fval is the sum of increases in hydraulic braking forces of the individual wheels, which correspond to the above-described linear-valve differential pressures $\Delta P1$ and $\Delta P2$. Specifically, the linear-valve differential pressure fraction Fval is a value obtained by adding the sum of increases in hydraulic braking forces of the wheels FR and FL which have occurred as a result of increases in the wheel-cylinder hydraulic pressures Pwfr and Pwfl from the first VB hydraulic pressure Pm by the linear-valve differential pressure $\Delta P1$, to the sum of increases in hydraulic braking forces of the wheels RR and RL which have occurred as a result of increases in the wheel-cylinder hydraulic pressure Pwrr and Pwrl from the second VB hydraulic pressure Pm by the linear-valve differential pressure $\Delta P2$.

Notably, in the present example, the linear-valve differential pressure $\Delta P2$ (accordingly, the rear-wheel-side instruction differential pressure $\Delta Pdr$) is maintained at zero. Therefore, the linear-valve differential pressure fraction Fval based on the linear-valve differential pressure $\Delta P1$ acts only on the front wheels. That is, the compensation braking force Fcomp, which is the sum of the regenerative braking force Freg and the linear-valve differential pressure fraction Fval, acts only on the front wheels.

That is, the braking forces acting on the front wheels are controlled by means of the regenerative braking force Freg and hydraulic braking force (Fvbf+Fval) composed of a fraction of the VB hydraulic pressure fraction Fvb distributed to the front wheels (hereinafter referred to as the "front-wheel-side VB hydraulic pressure fraction Fvbf") and the linear-valve differential pressure fraction Fval (that is, an increase in hydraulic braking force corresponding to the linear-valve differential pressure $\Delta P1$; front-wheel-side added hydraulic braking force). The braking force acting on the rear wheels is controlled only by means of hydraulic braking force composed of only a fraction of the VB hydraulic pressure fraction Fvb distributed to the rear wheels (hereinafter referred to as the "rear-wheel-side VB hydraulic pressure fraction Fvbr"). As a result, even when a change arises in the proportion of the linear-valve differential pressure fraction Fval in the compensation braking force Fcomp, the ratio between the braking force acting on the front wheels and that acting on the rear wheels can be maintained constant.

Moreover, in principle (that is, when ABS control is not performed), the present apparatus sets the regenerative braking force Freg such that the proportion of the regenerative braking force Freg in the compensation braking force Fcomp becomes large to a possible extent. Specifically, the present apparatus first obtains on the basis of the brake pedal depressing force Fp the compensation braking force Fcomp which is required to render the total braking force (=Fvb+Fcomp) coincident with a target value (a value on the solid line A corresponding to the brake pedal depressing force Fp). For example, as shown in FIG. 4, when the brake pedal depressing force Fp assumes a value Fp1, the compensation braking force Fcomp is set to a value Fcomp1. The above-described target regenerative braking force Fregt is set to this value.

When the target regenerative braking force Fregt is not in excess of the allowable maximum regenerative braking force Fregmax, the present apparatus sets the actual regenerative braking force Fregact to a value equal to the target regenerative braking force Fregt. Meanwhile, when the target regenerative braking force Fregt is in excess of the allowable maximum regenerative braking force Fregmax, the present apparatus sets the actual regenerative braking force Fregact to a value equal to the allowable maximum regenerative braking force Fregmax. With this operation, the regenerative braking force Freg is set to a largest possible value unless it does not exceed the allowable maximum regenerative braking force Fregmax.

The present apparatus then controls the linear-valve differential pressure $\Delta P1$ produced by the linear valve PC1 such that the value obtained by subtracting the actual regenerative braking force Fregact from the compensation braking force Fcomp (that is, the target regenerative braking force Fregt) becomes equal to the linear-valve differential pressure fraction Fval. Notably, when the target regenerative braking force Fregt is not in excess of the allowable maximum regenerative braking force Fregmax, the linear-valve differential pressure $\Delta P1$ (and the linear-valve differential pressure $\Delta P2$) is set to zero. As a result, the linear-valve differential pressure fraction Fval becomes zero, so that the compensation braking force Fcomp is composed of only the regenerative braking force Freg.

By virtue of the above-described operation, electrical energy generated by the motor M can be collected in the battery B during operation of the brake pedal BP, and the characteristic of the total braking force (=Fvb+Fcomp) with respect to the brake pedal depressing force Fp can be rendered coincident with the target characteristic illustrated by the solid line A in FIG. 4.

Here, the allowable maximum regenerative braking force Fregmax will be additionally described. The greater the degree to which the value of the above-mentioned SOC decreases, the greater the value to which the allowable maximum regenerative braking force Fregmax is set. This is because the allowance of the battery B in terms of charging increases as the value of the above-mentioned SOC decreases. Further, in consideration of the characteristic of the motor M, which is an AC synchronous motor, the lower the rotational speed of the motor M (that is, vehicle body speed), the greater the value to which the allowable maximum regenerative braking force Fregmax is set.

In addition, the regenerative braking force Freg tends to become difficult to accurately control when the rotational speed of the motor M (that is, vehicle body speed) becomes very low. Meanwhile, the linear-valve differential pressure fraction Fval can be accurately controlled even when the vehicle body speed is very low. Accordingly, conceivably, when the vehicle body speed becomes equal to or lower than a predetermined very low speed (e.g., immediately before the vehicle stops), it is preferred to gradually decrease the regenerative braking force Freg and increase the proportion of the linear-valve differential pressure fraction Fval as the vehicle body speed decreases. Therefore, the present apparatus is configured such that when the vehicle body speed becomes equal to or lower than a predetermined very low speed, the apparatus gradually decreases the allowable maximum regenerative braking force Fregmax from the actual regenerative braking force Fregact at that time as the vehicle body speed decreases.

Figure 5:
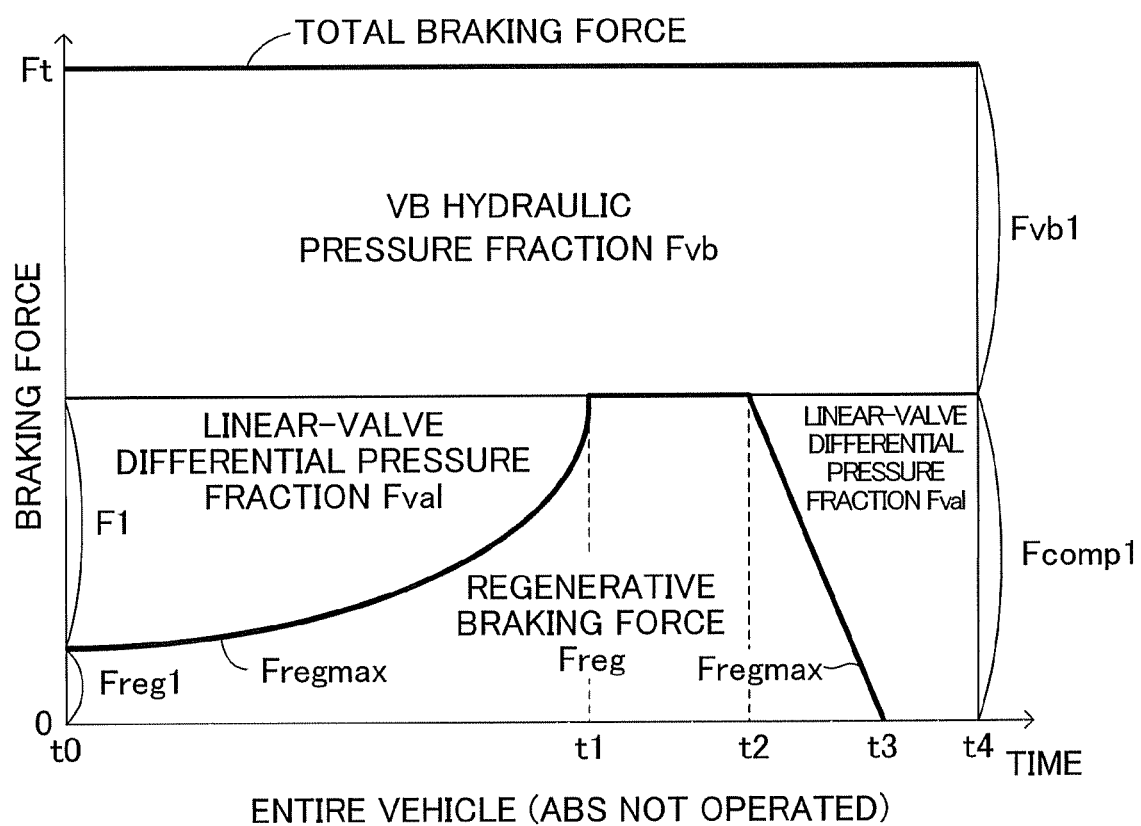
FIG. 5 is a time chart showing changes in total braking force; i.e., VB hydraulic-pressure fraction, regenerative braking force, and linear-valve differential pressure fraction, which are braking forces for the entire vehicle, in a case where the vehicle decelerates (ABS not operated)

FIG. 5 is a time chart showing changes in the VB hydraulic-pressure fraction Fvb, the regenerative braking force Freg, and the linear-valve differential pressure fraction Fval (accordingly, total braking force) for the case in which a driver operates the brake pedal BP, while causing the vehicle to travel at a certain speed, such that the brake pedal depressing force Fp is maintained at the above-mentioned Fp1 (see FIG. 4) during a period from time t0 to t4 at which the vehicle stops (and ABS control is not performed).

As shown in FIG. 4, when the brake pedal depressing force Fp is maintained at the above-mentioned Fp1, the VB hydraulic pressure fraction Fvb is set to the value Fvb1, and the compensation braking force Fcomp (=Freg+Fval); i.e., the target regenerative braking force Fregt, is maintained at the value Fcomp1. Accordingly, in the case of this example, as shown in FIG. 5, the VB hydraulic pressure fraction Fvb is maintained at the value Fvb1 and the compensation braking force Fcomp (=Freg+Fval) is maintained at the value Fcomp1 over the period from time t0 to time t4.

Also, in the case of this example, the allowable maximum regenerative braking force Fregmax is assumed to reach a value Freg1 (<the value Fcomp1) at time t0 at which the vehicle body speed is high, increase with elapse of time (with a decrease in the vehicle body speed) after time t0, and reach the value Fcomp1 at time t1.

In this case, the regenerative braking force Freg (the actual regenerative braking force Fregact) is set to the value Freg1 at time t0, subsequently increases with elapse of time after that, and is set to the value Fcomp1 at time t1. Meanwhile, the linear-valve differential pressure fraction Fval is set to a value F1 (=Fcomp1−Freg1) after time t0, subsequently decreases with elapse of time, and becomes zero at time t1.

Even after time t1, the allowable maximum regenerative braking force Fregmax continuously increases from the value Fcomp1 with a decrease in the vehicle body speed As a result, after time t1, the regenerative braking force Freg is maintained at the value Fcomp1, and the linear-valve differential pressure fraction Fval (accordingly, the linear-valve differential pressure $\Delta P1$ (and the linear-valve differential pressure $\Delta P2$)) is maintained at zero.

The vehicle body speed is assumed to reach a first predetermined speed, which is equal to the above-mentioned very low speed, at time t2 in this state. As a result, after time t2, the allowable maximum regenerative braking force Fregmax gradually decreases with a decrease in the vehicle body speed from the value Fcomp1, which is equal to the actual regenerative braking force Fregact at time t2. Further, the allowable maximum regenerative braking force Fregmax is assumed to be maintained at zero in a period between time t3 at which the vehicle body speed reaches a second predetermined speed lower than the first predetermined speed and time t4 at which the vehicle stops.

In this case, the regenerative braking force Freg gradually decreases from the value Fcomp1 after time t2, and is set to zero during the period between time t3 and time t4. Meanwhile, the linear-valve differential pressure fraction Fval gradually increases from zero after time t2, and is set to the value Fcomp1 during the period between time t3 and time t4.

In the above-described manner, in the case of this example, the sum of the regenerative braking force Freg and the linear-valve differential pressure fraction Fval (i.e., the compensation braking force Fcomp) is maintained at the value Fcomp1, although the ratio between the regenerative braking force Freg and the linear-valve differential pressure fraction Fval changes depending on the relation of magnitude between the target regenerative braking force Fregt and the allowable maximum regenerative braking force Fregmax. Accordingly, the total braking force (=Fvb+Fcomp) is maintained at a value Ft (see FIGS. 4 and 5). In other words, the characteristic of the total braking force with respect to the brake pedal depressing force Fp is rendered coincident with the target characteristic, which is indicated by the solid line A in FIG. 4.

As is apparent from the above, means for adjusting the compensation braking force Fcomp (specifically, the regenerative braking force Freg and the linear-valve differential pressure fraction Fval) in accordance with the brake pedal depressing force Fp corresponds to the regeneration-coordinative brake control means.

Outline of ABS Control

The present apparatus can perform not only the above-described regeneration-coordinative brake control, but also known ABS control for each wheel individually. ABS control is a control operation for controlling the pressure-increasing valve PU and the pressure-reducing valve PD for the wheel undergoing ABS control to thereby adjust the wheel-cylinder hydraulic pressure Pw to a hydraulic pressure lower than the control hydraulic pressure (P1 or P2) in accordance with a predetermined pattern.

With this operation, the hydraulic braking force acting on the wheel undergoing ABS control is also controlled to a smaller value, as compared with the case where ABS control is not performed, in accordance with a pattern which is the same as the above-mentioned predetermined pattern. As a result, locking of the wheel undergoing ABS control is suppressed. Detailed description of ABS control is omitted.

Means for performing ABS control in this manner corresponds to the antiskid control means.

Limit of Regenerative Braking Force During Performance of ABS Control

Here, there will be considered a case in which ABS control is performed for a wheel subjected to a regenerative braking force (a wheel undergoing regenerative braking; in the present example, either one or both of the front wheels) during a period in which the above-described regeneration-coordinative brake control is being performed.

In this case, if the regenerative braking force Freg acting on the wheel undergoing ABS control is large, in some cases, locking of the wheel undergoing ABS control cannot be properly suppressed through mere adjustment of the hydraulic braking force by ABS control.

This will be described by use of the example shown in FIG. 5. In the case of this example (ABS control not performed), the front-wheel-side VB hydraulic pressure fraction Fvbf, the regenerative braking force Freg, and the linear-valve differential pressure fraction Fval, which are braking forces (front-wheel-side total braking force) acting on the front wheels change as shown in FIG. 6.

Figure 6:
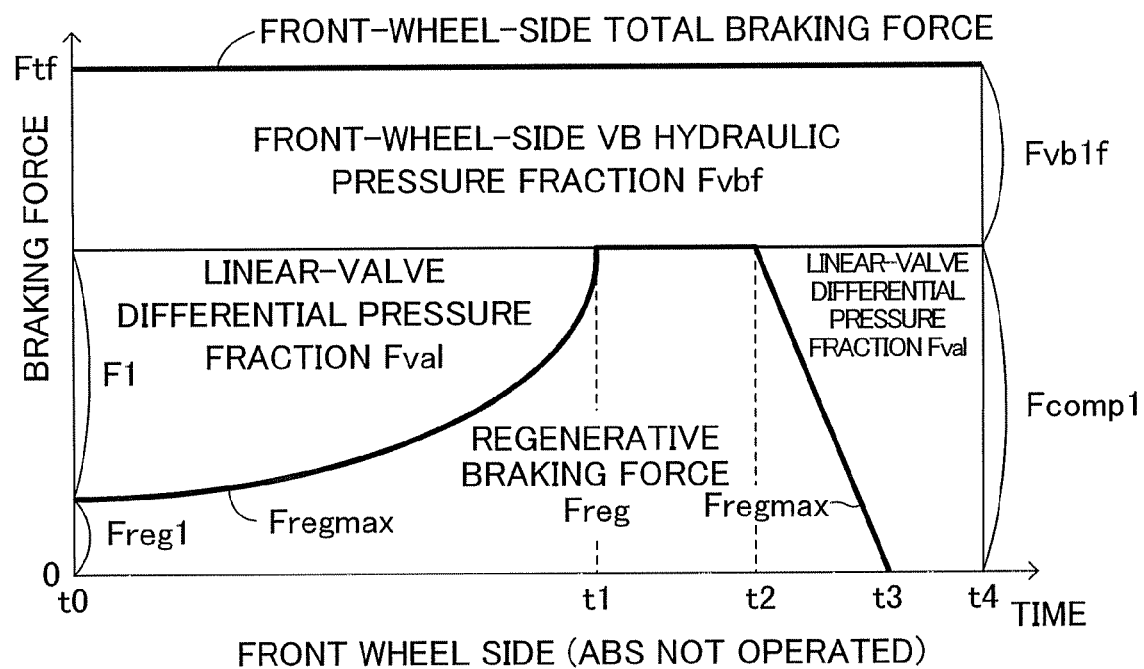
FIG. 6 is a time chart showing changes in front-wheel-side total braking force; i.e., front-wheel-side VB hydraulic-pressure fraction, regenerative braking force, and linear-valve differential pressure fraction, which are braking forces for the front wheels of the vehicle, in the condition same as the condition of FIG. 5 (ABS not operated)

As described above, since all of the compensation braking force Fcomp (=Fcomp1) acts on the front wheels, the regenerative braking force Freg and the linear-valve differential pressure fraction Fval change in the same manner in both the case of FIG. 5 and the case of FIG. 6. Accordingly, when ABS control is not performed, as shown in FIG. 6, the front-wheel-side total braking force is maintained at a value Ftf (=Fcomp1+Fvb1f), which is smaller, by a rear-wheel-side VB hydraulic pressure fraction Fvbr, than the value Ft (=Fcomp1+Fvb1), which the total braking force shown in FIG. 5 (the sum of the front-wheel-side total braking force and the rear-wheel-side total braking force). Here, the value Fvb1f is a value of the front-wheel-side VB hydraulic pressure fraction Fvbf for the case where the VB hydraulic pressure fraction Fvb assumes the value Fvb1 (that is, the case where the brake pedal depressing force Fp assumes the value Fp1 (see FIG. 4)).

Figure 7:
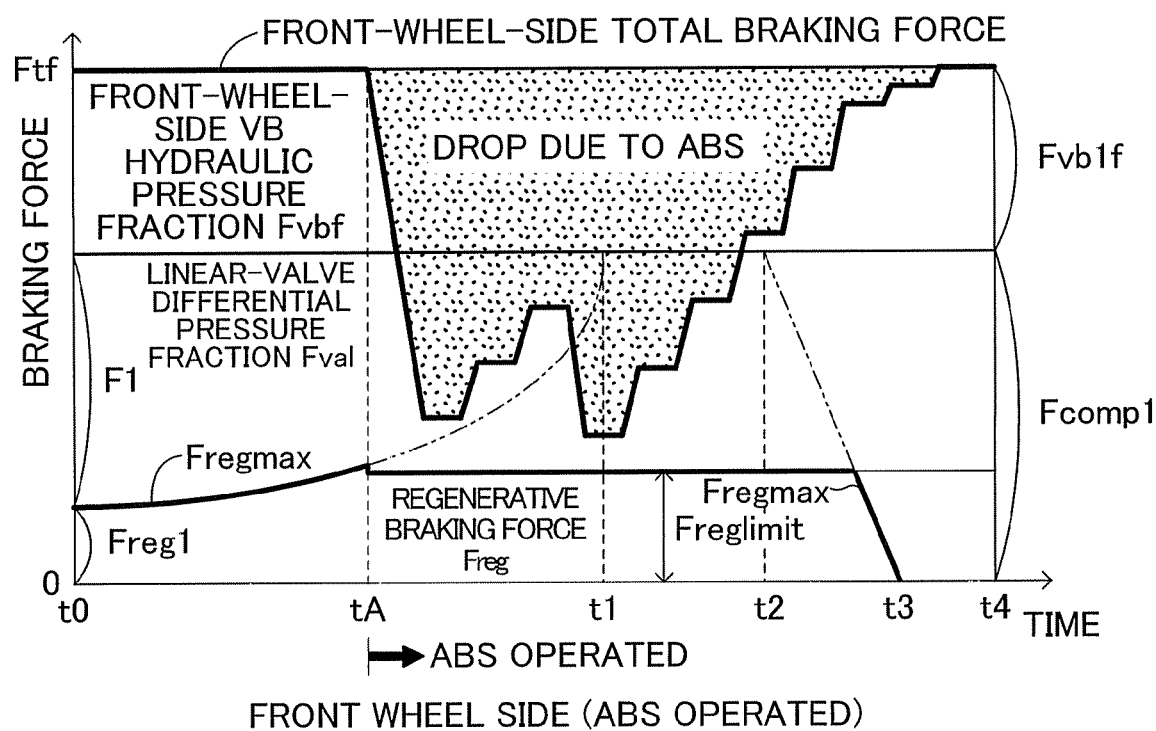
FIG. 7 is a time chart showing changes in front-wheel-side total braking forces; i.e., front-wheel-side VB hydraulic-pressure fraction, regenerative braking force, and linear-valve differential pressure fraction, which are braking forces for the front wheels of the vehicle, in the condition same as the condition of FIG. 5 (ABS operated)

Next, there is considered the following case. In a state in which the braking force acting on the front wheels changes as shown in FIG. 6, ABS control is simultaneously performed for the front wheels (wheels undergoing regenerative braking) from time tA between time t0 and time t1 as shown in FIG. 7. The total braking force acting on the front wheels must be adjusted to a value (value smaller than the value Ftf) which changes in accordance with the pattern shown in FIG. 7 during a period between time tA and time t4. The dotted region of FIG. 7 corresponds to the amount by which the wheel-cylinder hydraulic pressures Pwfl and Pwfr are reduced by means of the pressure-reducing valves PDfl and PDfr, which are opened and closed under the ABS control.

In this case, under the assumption that after time tA the regenerative braking force Freg changes in the same manner as in the case shown in FIG. 6 where ABS control is not performed (see the two-dot chain line in FIG. 7), there is produced a period (between a point in time immediately before time t1 and a point in time immediately before time t2) in which the regenerative braking force Freg becomes greater than the "value which changes in accordance with the above-described pattern."

Accordingly, in such a period, even if the front-wheel-side hydraulic braking force (specifically, the wheel-cylinder hydraulic pressures Pwfl and Pwfr) is reduced to zero by means of ABS control, locking of the front wheels cannot be properly suppressed, because the front-wheel-side total braking force becomes greater than the "value which changes in accordance with the above-described pattern." That is, proper ABS control cannot be achieved. As described above, when the regenerative braking force Freg acting on the wheel undergoing ABS control is large, the ABS control may be adversely influenced.

However, in the case where when the wheel undergoing ABS control is to undergo regenerative braking, the regenerative braking force Freg is adjusted to zero in order to remove the adverse influence on the ABS control, electrical energy cannot be collected in the battery at all during a period in which ABS control is performed. Therefore, energy efficiency cannot be improved.

In view of the above, in the present apparatus, when the wheel undergoing ABS control is to undergo regenerative braking, a limit regenerative braking force Freglimit (>0) represented by the following Equation (1) is set, and when the regenerative braking force Freg exceeds the limit regenerative braking force Freglimit during performance of ABS control, the regenerative braking force Freg is limited to the limit regenerative braking force Freglimit. That is, in this case, the regenerative braking force Freg is limited to the smaller value of the above-described allowable maximum regenerative braking force Fregmax and the limit regenerative braking force Freglimit.

$$F\text{reglimit} = \mu \cdot Wf \tag{1}$$

In Equation (1), $\mu$ represents the frictional coefficient of the road surface. In the present example, the road-surface frictional coefficient $\mu$ is obtained by dividing, by gravitational acceleration g, vehicle body deceleration Gx during ABS control, which is obtained from the front-rear acceleration sensor 85 ($\mu = Gx/g$). Wf represents load acting on the front wheels, and can be obtained in accordance with the following Equation (2) in which load increase (dynamic load) generated as a result of deceleration of the vehicle is taken into consideration.

$$Wf = Wf\text{stable} + (Gx/g \cdot W \cdot H/L) \tag{2}$$

In Equation (2), Wfstable represents the static load of the front wheels; W represents the total weight of the vehicle; H represents the height of the centroid of the vehicle body from the road surface; and L represents the wheel base. The second term of the right side of Equation (2) corresponds to the above-mentioned dynamic load produced as a result of deceleration of the vehicle. When the above-described relation ($\mu = Gx/g$) is applied to the second term of the right side, the limit regenerative braking force Freglimit can be represented by the following Equation (3)

$$F\text{reglimit} = \mu \cdot (Wf\text{stable} + (\mu \cdot W \cdot H/L)) \tag{3}$$

The limit regenerative braking force Freglimit obtained by Equation (1) (that is, Equation (3)) corresponds to the maximum value of force which can be generated by means of friction between the tires of the front wheels and the road surface and which decelerates the vehicle body; i.e., the upper limit of braking force within the range in which locking of the front wheels does not occur. Accordingly, When the regenerative braking force Freg is limited to the limit regenerative braking force Freglimit or a smaller force during a period in which ABS control is performed for the wheel undergoing regenerative braking, the regenerative braking force Freg does not adversely influence the ABS control.

In the example shown in FIG. 7 in which ABS control is performed, after time tA, the regenerative braking force Freg is limited to the smaller value of the allowable maximum regenerative braking force Fregmax and the limit regenerative braking force Freglimit. Therefore, the regenerative braking force Freg changes as indicated by a solid line in FIG. 7. Notably, in the period during which the regenerative braking force Freg is controlled to a value equal to the limit regenerative braking force Freglimit (period in which the fractions of the compensation braking force Fcomp are adjusted) in FIG. 7, the linear-valve differential pressure fraction Fval is controlled to a value (Fcomp1−Freglimit).

Thus, the limit regenerative braking force Freglimit does not exceed the "value which changes in accordance with the above-described pattern." According, through adjustment of the hydraulic braking force by means of ABS control, the total braking force of the front wheels properly changes in accordance with the pattern shown in FIG. 7 over the period between time tA and time t4. As a result, some electrical energy can be collected in the battery B, without adverse influences on the ABS control.

As is apparent from the above, means for obtaining the limit regenerative braking force Freglimit (>0) in accordance with Equation (1) (that is, Equation (3)) corresponds to the limit-regenerative-braking-force obtaining means. Further, means for changing and adjusting the proportion of the regenerative braking force Freg in the compensation braking force Fcomp during performance of ABS control corresponds to the regenerative-braking-force adjustment means.

Notably, the present apparatus limits the regenerative braking force Freg to the smaller value of the allowable maximum regenerative braking force Fregmax and the limit regenerative braking force Freglimit not only when the wheels undergoing regenerative braking are to undergo ABS control, but also when only the wheels not undergoing regenerative braking (rear wheels in the present example) are to undergo ABS control.

The above operation is performed because, in a condition in which ABS control is performed for the rear wheels only, ABS control is highly likely to be started for the front wheels immediately thereafter, control involves a delay, and the inverter I has operation delay, among other reasons. That is, through an operation of previously limiting the regenerative braking force Freg to the limit regenerative braking force Freglimit or a smaller force from a state in which ABS control is performed for the rear wheels only as described above, it becomes possible to reliably eliminate adverse influences of the regenerative braking force Freg on ABS control performed for the front wheels, which adverse influences would otherwise occur when ABS control for the front wheels starts later on.

Actual Operation

Actual operation of the brake control apparatus 10 according to the embodiment of the present invention will be explained while referring to FIGS. 8 and 9, which show routines executed by the brake control ECU 50 (its CPU) in the form of flowcharts, and FIGS. 10 and 11, which show routines executed by the HV control ECU 60 (its CPU) in the form of flowcharts, for the case where the regenerative braking force Freg is limited to the smaller value of the allowable maximum regenerative braking force Fregmax and the limit regenerative braking force Freglimit not only when the wheels undergoing regenerative braking (i.e., specific wheel(s); the front wheels in this example) are to undergo ABS control, but also when only the wheels not undergoing regenerative braking (rear wheels in the present example) are to undergo ABS control (i.e., when any wheel is to undergo ABS control).

Figure 8:
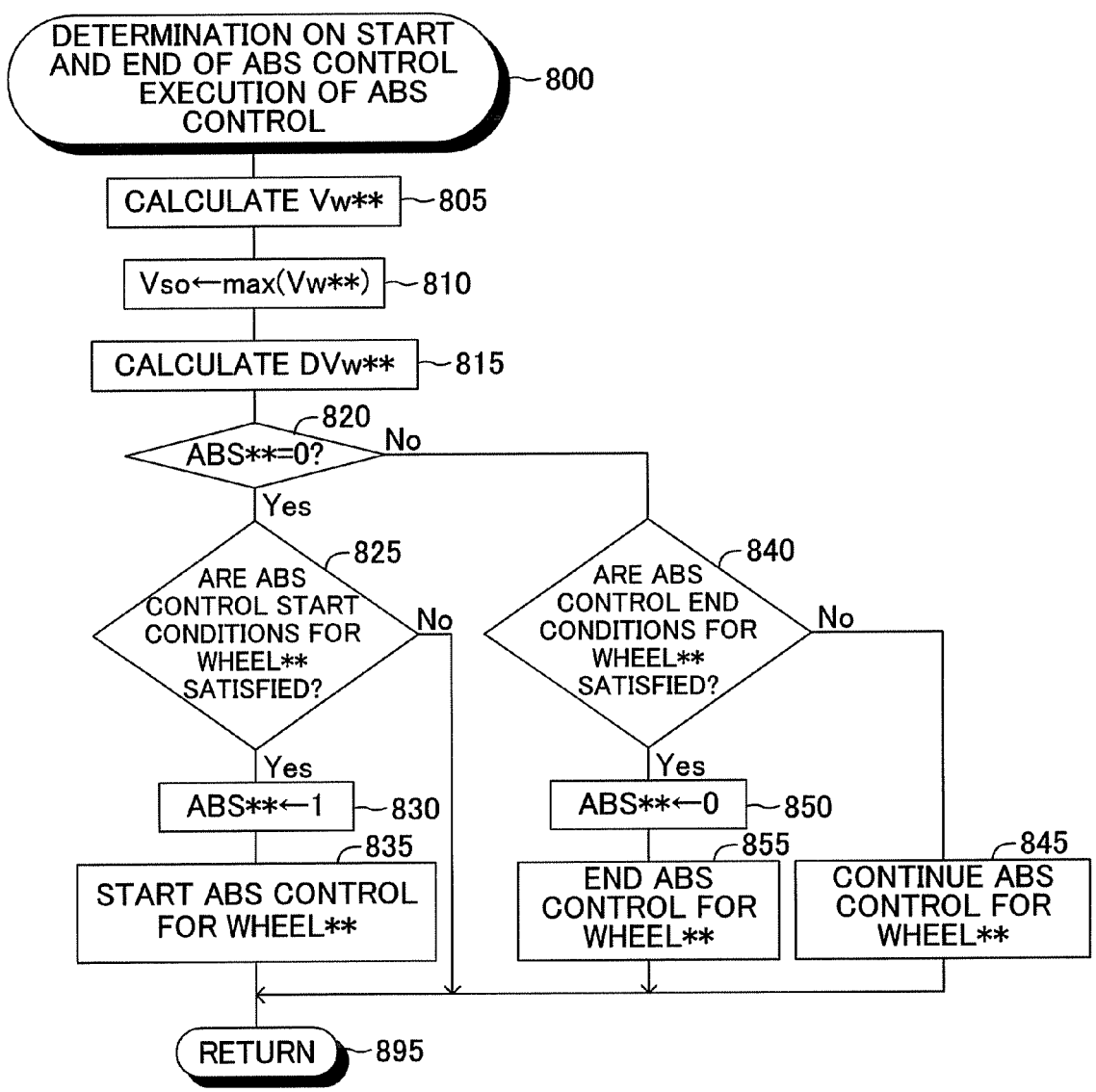
FIG. 8 is a flowchart showing a routine which the brake control ECU shown in FIG. 1 executes in order to perform judgment on start and end of ABS control and to perform ABS control.

The brake control ECU 50 repeatedly performs, at predetermined intervals (execution intervals Δt; e.g., 6 msec), the routine shown in FIG. 8 for performing determination as to start and end of ABS control and for performing the ABS control. Accordingly, when a predetermined timing is reached, the brake control ECU 50 starts processing of the routine from Step 800, and proceeds to Step 805 so as to calculate the wheel speed Vw of the wheel (the speed of the outer periphery of the wheel) at the present moment. Specifically, the brake control ECU 50 calculates the wheel speed Vw on the basis of the changing frequency of a signal output by each wheel speed sensor 81\*\*.

Next, the brake control ECU 50 proceeds to Step 810 and sets the estimated vehicle body speed Vso to the highest value among the wheel speeds Vw. Subsequently, the brake control ECU 50 proceeds to Step 815 and calculates the wheel deceleration DVw of the wheel at the present moment through time-differentiation of the wheel speed Vw.

Next, the brake control ECU 50 proceeds to Step 820 so as to determine whether the value of an ABS control execution flag ABS for the wheel is "0." The ABS control execution flag ABS indicates, when its value is "1," that ABS control is currently performed for the wheel, and indicates, when its value is "0," that ABS control is not currently performed for the wheel**.

The description will be continued on the assumption that the ABS control is not currently performed for the wheel, and ABS control start conditions, which will be described later, are not satisfied for the wheel. In this case, the brake control ECU 50 makes a "Yes" determination in Step 820, and then proceeds to Step 825 in order to determine whether the ABS control start conditions are satisfied for the wheel. The ABS control start conditions are satisfied when, for example, the brake pedal depressing force Fp is greater than zero, the value obtained by subtracting the wheel speed Vw from the estimated vehicle body speed Vso is equal to or greater than a predetermined value, and the wheel deceleration DVw** is equal to or greater than a predetermined value.

Since the ABS control start conditions are not satisfied at the present stage, the brake control ECU 50 makes a "No" determination in Step 825, and immediately proceeds to Step 895 in order to end the current execution of the present routine. After that, until the ABS control start conditions are satisfied, the brake control ECU 50 repeatedly executes the processing in Steps 805 to 825. As a result, the value of the ABS control execution flag ABS is maintained at "0."

Figure 9:
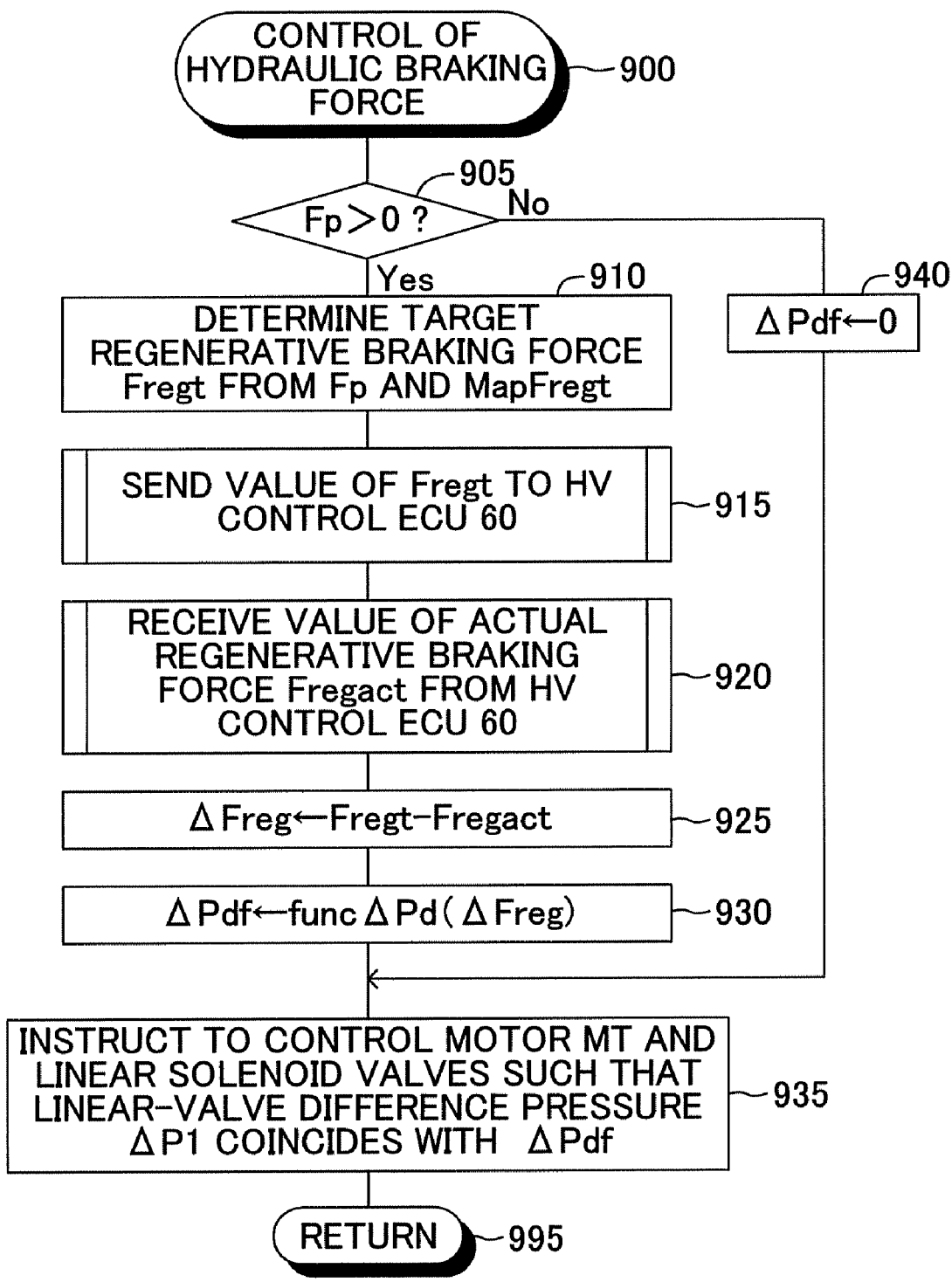
FIG. 9 is a flowchart showing a routine which the brake control ECU shown in FIG. 1 executes in order to control hydraulic braking force.

Further, the brake control ECU 50 repeatedly performs, at predetermined intervals (execution intervals Δt; e.g., 6 msec), the routine shown in FIG. 9 for controlling hydraulic braking force. Accordingly, when a predetermined timing is reached, the brake control ECU 50 starts processing of the routine from Step 900, and proceeds to Step 905 so as to determine whether or not the brake pedal depressing force Fp at the present time, which is obtained from the brake-pedal depressing force sensor 83, is greater than zero (that is, whether or not the brake pedal BP is being operated).

Here, the brake pedal BP is assumed to be being operated. In this case, the brake control ECU 50 makes a "Yes" determination in Step 905, and then proceeds to Step 910 so as to determine a target regenerative braking force Fregt (that is, compensation braking force Fcomp) from the obtained brake pedal depressing force Fp with reference to a table MapFregt (Fp) for obtaining the target regenerative braking force Fregt while using the brake pedal depressing force Fp as an argument. As a result, the target regenerative braking force Fregt is set to a value equal to a compensation braking force Fcomp corresponding to the current value of the brake pedal depressing force Fp shown in FIG. 4.

Next, the brake control ECU 50 proceeds to Step 915, and sends the value of the target regenerative braking force Fregt determined in Step 910 to the HV control ECU 60 via CAN communications. In Step 920 subsequent thereto, the brake control ECU 50 receives, via CAN communications, the latest value of the actual regenerative braking force Fregact calculated by the HV control ECU 60 in a routine which will be described later.

Subsequently, the brake control ECU 50 proceeds to Step 925, and obtains a regenerative braking force shortage ΔFreg by subtracting the received actual regenerative braking force Fregact from the target regenerative braking force Fregt determined in Step 910.

Next, the brake control ECU 50 proceeds to Step 930, and obtains the front-wheel-side instruction differential pressure ΔPdf from the obtained regenerative braking force shortage ΔFreg in accordance with a function funcΔPdf(ΔFreg) for obtaining an instruction differential pressure ΔPd while using ΔFreg as an argument. Notably, the rear-wheel-side instruction differential pressure ΔPdr is maintained at zero. As a result, the front-wheel-side instruction differential pressure ΔPdf is set to a value for rendering the linear-valve differential pressure fraction Fval equal to the obtained regenerative braking force shortage ΔFreg.

The brake control ECU 50 then proceeds to Step 935, and outputs instructions for controlling the motor MT and the linear solenoid valve PC1 such that the linear-valve differential pressure ΔP1 becomes equal to the obtained front-wheel-side instruction differential pressure ΔPdf. Subsequently, the brake control ECU 50 proceeds to Step 995 so as to end the current execution of the present routine. As a result, the linear-valve differential pressure ΔP1 is controlled to coincide with the front-wheel-side instruction differential pressure ΔPdf. Notably, the linear-valve differential pressure ΔP2 is maintained at zero.

Meanwhile, if the brake pedal BP is assumed not to be being operated, the brake control ECU 50 makes a "NO" determination when it proceeds to Step 905, and then proceeds to Step 940 so as to set the front-wheel-side instruction differential pressure ΔPdf to zero. After that, the brake control ECU 50 performs the processing of the above-described Step 935. As a result, both the linear-valve differential pressures ΔP1 and ΔP2 are set to zero, so that the linear-valve differential pressure fraction Fval becomes zero. Further, in this case, since the actual regenerative braking force Fregact is also set to zero as described later, the compensation braking force Fcomp becomes zero. Accordingly, the total braking force becomes zero.

Figure 10:
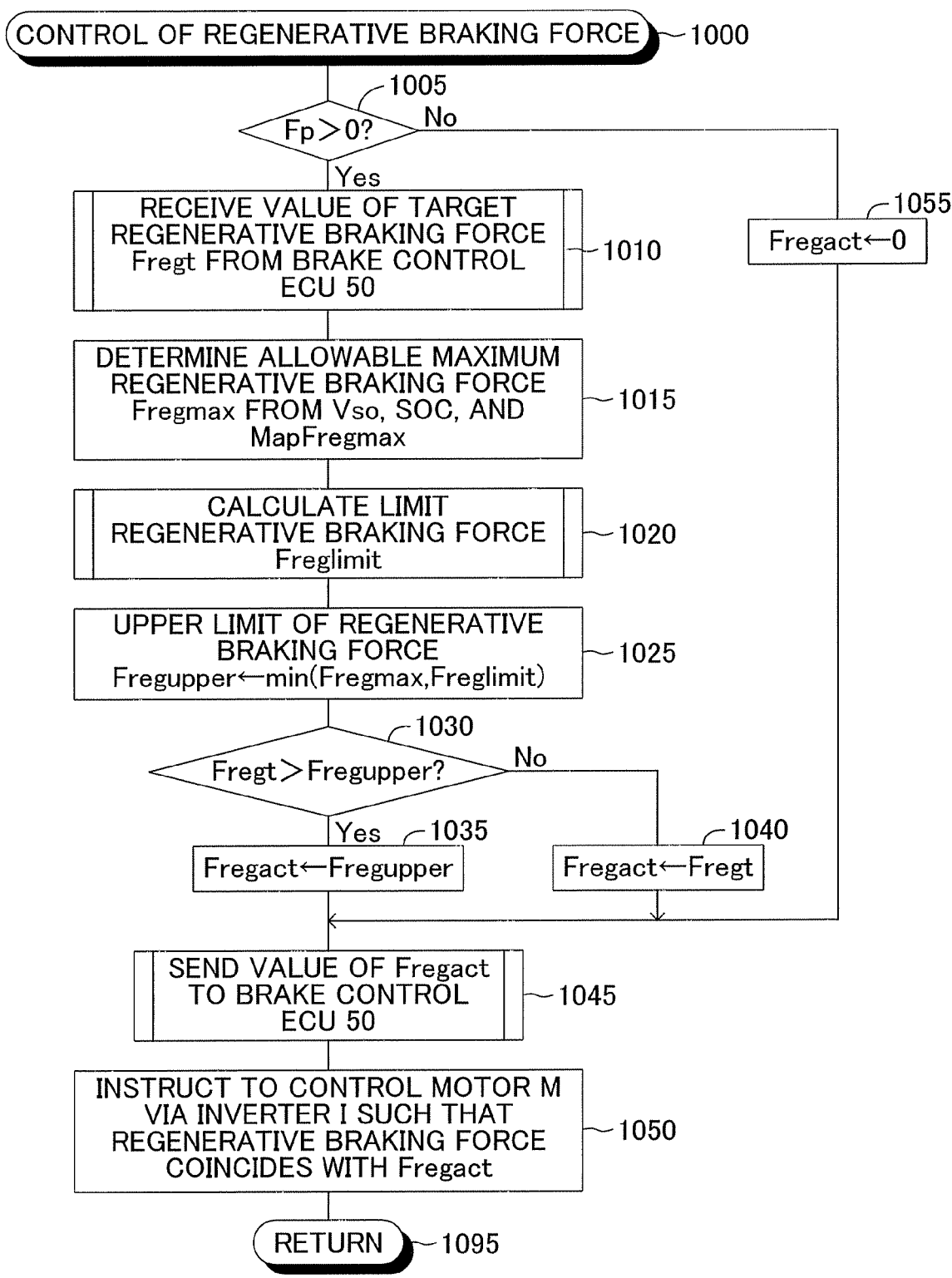
FIG. 10 is a flowchart showing a routine which the hybrid control ECU shown in FIG. 1 executes in order to control regenerative braking force.

Meanwhile, the HV control ECU 60 repeatedly performs, at predetermined intervals (execution intervals Δt; e.g., 6 msec), the routine shown in FIG. 10 for controlling regenerative braking force. Accordingly, when a predetermined timing is reached, the HV control ECU 60 starts processing of the routine from Step 1000, and proceeds to Step 1005 so as to perform the same processing as in the above-described Step 905.

Here, the brake pedal BP is assumed to be being operated. In this case, the HV control ECU 60 makes a "Yes" determination in Step 1005, and then proceeds to Step 1010 so as to receive, via CAN communications, the value of the target regenerative braking force Fregt sent from the brake control ECU 50 by means of the processing of the previously described Step 915. Next, the HV control ECU 60 proceeds to Step 1015, and determines the allowable maximum regenerative braking force Fregmax from the estimated vehicle body speed Vso which the brake control ECU 50 has obtained in the previously described Step 810 and the value of the above-described SOC obtained by the battery ECU, with reference to a table MapFregmax for obtaining the allowable maximum regenerative braking force Fregmax while using Vso and SOC as arguments.

Figure 11:
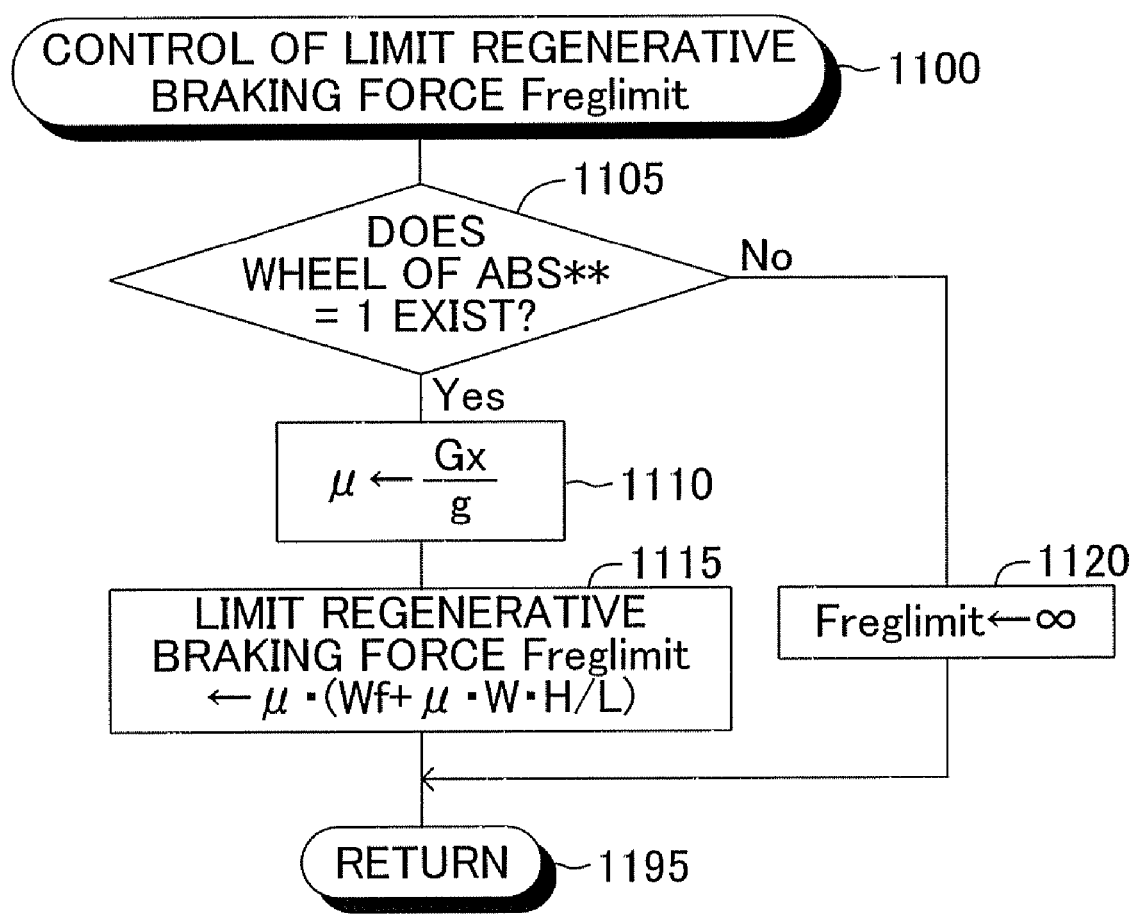
FIG. 11 is a flowchart showing a routine which the hybrid control ECU shown in FIG. 1 executes in order to calculate limit regenerative braking force.

Next, the HV control ECU 60 performs, via Step 1020, the routine shown in FIG. 11 for calculating the limit regenerative braking force Freglimit. When the HV control ECU 60 proceeds from Step 1100 to Step 1105, the HV control ECU 60 determines whether or not a wheel for which the value of the ABS control execution flag ABS** has been set to "1" is present (that is, whether or not a wheel undergoing ABS control is present).

Since no wheel is undergoing ABS control at the present moment, the HV control ECU 60 makes a "No" determination in Step 1105, and then proceeds to Step 1120 so as to set the value of the limit regenerative braking force Freglimit to "infinite." After that, the HV control ECU 60 proceeds to Step 1025 of FIG. 10 via Step 1195. As a result, the value of the limit regenerative braking force Freglimit always becomes greater than the allowable maximum regenerative braking force Fregmax, which is a finite value determined in the previously described step 1015.

After proceeding to Step 1025, the HV control ECU 60 sets a regenerative-braking-force upper limit Fregupper to the smaller value of the allowable maximum regenerative braking force Fregmax and the limit regenerative braking force Freglimit (infinity at the present moment). At the present moment, the regenerative-braking-force upper limit Fregupper is set to the value of the allowable maximum regenerative braking force Fregmax.

Subsequently, the HV control ECU 60 proceeds to Step 1030, and determines whether or not the received target regenerative braking force Fregt is greater than the regenerative-braking-force upper limit Fregupper. When the HV control ECU 60 makes a "Yes" determination in Step 1030, the HV control ECU 60 proceeds to Step 1035 so as to set the actual regenerative braking force Fregact to a value equal to the regenerative-braking-force upper limit Fregupper. Meanwhile, when the HV control ECU 60 makes a "No" determination Step 1030, the HV control ECU 60 proceeds to Step 1040 so as to set the actual regenerative braking force Fregact to a value equal to the target regenerative braking force Fregt. With this processing, the actual regenerative braking force Fregact is set to a value not greater than the regenerative-braking-force upper limit Fregupper. At the present moment, the actual regenerative braking force Fregact is set to a value not greater than the allowable maximum regenerative braking force Fregmax.

Next, the HV control ECU 60 proceeds to Step 1045 and sends the obtained value of the actual regenerative braking force Fregact to the brake control ECU 50 via CAN communications. The value of the actual regenerative braking force Fregact sent in this manner is received by the brake control ECU 50 in the previously described step 920.

The HV control ECU 60 then proceeds to Step 1050, and outputs an instruction to the inverter I for controlling the motor M via the inverter I such that the regenerative braking force Freg coincides with the actual regenerative braking force Fregact. After that, the HV control ECU 60 proceeds to Step 1095 so as to end the current execution of the present routine. With this processing, the motor M is controlled such that the regenerative braking force Freg stemming from the power generation resistance of the motor M coincides with the actual regenerative braking force Fregact.

Meanwhile, if the brake pedal BP is assumed not to be being operated, the HV control ECU 60 makes a "No" determination when it proceeds to Step 1005, and then proceeds to Step 1055. In this case, the HV control ECU 60 sets the actual regenerative braking force Fregact to zero, and then performs the processing in the above-described Steps 1045 and 1050. With this processing, the regenerative braking force Freg becomes zero. Further, in this case, the linear-valve differential pressure fraction Fval also becomes zero as described above, and thus, the total braking force becomes zero.

Next, there will be described the case where the ABS control start conditions for the wheel are satisfied in this state. In this case, the brake control ECU 50, which repeatedly executes the routine of FIG. 8, makes a "Yes" determination when it proceeds to Step 825, and proceeds to Step 830 so as to change the value of the ABS control execution flag ABS from "0" to "1." Subsequently, the brake control ECU 50 proceeds to Step 835, and starts ABS control for the wheel**.

After this point in time, since the value of the ABS control execution flag ABS is maintained at "1," for the wheel, the brake control ECU 50 makes a "No" determination in Step 820, and proceeds to Step 840. In Step 840, the brake control ECU 50 determines whether or not the ABS control end conditions are satisfied for the wheel**. The ABS control end conditions are satisfied, for example, when the brake pedal depressing force Fp becomes zero, when the estimated vehicle body speed Vso becomes equal to or less than the predetermined very low speed, or when a "state in which pressure increasing control is performed for all the wheels undergoing ABS control" has continued for a predetermined period of time.

The present point in time is immediately after the ABS control start conditions have been satisfied for the wheel, and the ABS control end conditions are not satisfied. Accordingly, the brake control ECU 50 makes a "No" determination in Step 840, and proceeds to Step 845 so as to continue the ABS control for the wheel, and then proceeds to Step 895 so as to end the current execution of the present routine. After that, the brake control ECU 50 repeatedly makes a "No" determination in Step 840 until the ABS control start conditions for the wheel are satisfied. With this processing, the ABS control for the wheel is continued, and the value of the value of the ABS control execution flag ABS** is maintained at "1."

As described above, when the value of the ABS control execution flag ABS is changed from "0" to "1" immediately after the ABS control for the wheel is started, the HV control ECU 60, which repeatedly executes the routine of FIG. 10, makes a "Yes" determination when it proceeds to Step 1105 of FIG. 11 via Step 1020, and then proceeds to Step 1110.

In Step 1110, the HV control ECU 60 obtains the road-surface frictional coefficient $\mu$ at the present moment by dividing, by the gravitational acceleration g, the vehicle deceleration Gx at the present moment obtained from the front-rear acceleration sensor 85. The HV control ECU 60 then proceeds to Step 1115, and obtains the limit regenerative braking force Freglimit (>0) from the current value of the road-surface frictional coefficient $\mu$ in accordance with the above-described Equation (3).

As a result, during a period in which any one of the wheels undergoes ABS control, by virtue of the processing of Step 1025 of FIG. 10, the regenerative-braking-force upper limit Fregupper is set to a smaller value of the limit regenerative braking force Freglimit determined in Step 1115 and the allowable maximum regenerative braking force Fregmax obtained in Step 1015.

By virtue of the processing in Steps 1030 to 1040, the actual regenerative braking force Fregact (that is, the regenerative braking force Freg) is limited not to exceed the smaller one of the limit regenerative braking force Freglimit determined in Step 1115 and the allowable maximum regenerative braking force Fregmax obtained in Step 1015.

Next, there will be described the case where the ABS control end conditions for the wheel are satisfied in this state. In this case, the brake control ECU 50, which repeatedly executes the routine of FIG. 8, makes a "Yes" determination when it proceeds to Step 840, and proceeds to Step 850 so as to change the value of the ABS control execution flag ABS from "1" to "0." Subsequently, the brake control ECU 50 proceeds to Step 855, and ends the ABS control for the wheel**.

After this point in time, since the value of the ABS control execution flag ABS is maintained at "0," the brake control ECU 50 makes a "Yes" determination when its proceeds to Step 820, and then proceeds to Step 825 so as to again monitor whether the ABS control start conditions for the wheel are satisfied.

Here, the ABS control is assumed not to be performed any longer for any wheel. In this case, the HV control ECU 60 makes a "No" determination when it proceeds to Step 1105 of FIG. 11, and then proceeds to Step 1120 so as to again set the limit regenerative braking force Freglimit to "infinity."

With this processing, the actual regenerative braking force Fregact (accordingly, the regenerative braking force Freg) is no longer limited to the limit regenerative braking force Freglimit or less, and the regenerative braking force Freg is again set to a value not greater than the allowable maximum regenerative braking force Fregmax.

As described above, in the brake (control) apparatus for a vehicle according to the embodiment of the present invention, the front-wheel-side braking force is controlled by means of the regenerative braking force Freg and the hydraulic braking force (Fvbf+Fval) composed of a fraction of the VB hydraulic pressure fraction Fvb distributed to the front wheels (front-wheel-side VB hydraulic pressure fraction Fvbf) and a linear-valve differential pressure fraction Fval (an increase in hydraulic braking force corresponding to the linear-valve differential pressure ΔP1; front-wheel-side added hydraulic braking force). The rear-wheel-side braking force is controlled only by means of the hydraulic braking force (Fvbr) composed of a fraction of the VB hydraulic pressure fraction Fvb distributed to the rear wheels (rear-wheel-side VB hydraulic pressure fraction Fvbr). The regeneration-coordinative brake control is performed in this manner, whereby the characteristic of the total braking force (=VB hydraulic pressure fraction Fvb+compensation braking force Fcomp (=Fval+Freg)) with respect to the brake pedal depressing force Fp is rendered coincident with the target characteristic indicated by the solid line A in FIG. 4.

In the present embodiment, when ABS control is not performed, the regenerative braking force Freg is set so as not to exceed the allowable maximum regenerative braking force Fregmax, which is the maximum value of allowable regenerative braking force. Meanwhile, when ABS control is started for any wheel, the regenerative braking force Freg is set not to exceed the smaller value of the allowable maximum regenerative braking force Fregmax and the limit regenerative braking force Freglimit.

The limit regenerative braking force Freglimit is a value determined in accordance with the above-described Equation (3) (Freglimit=$\mu$·Wf), and is set to the upper limit of braking force under which locking of the front wheels (wheels undergoing regenerative braking) does not occur in a case in which the regenerative braking force acts on the front wheels. Accordingly, in the case where ABS control is performed for the front wheels, each of which is a wheel undergoing regenerative braking, some electrical energy can be collected in the battery B without adverse influence on the ABS control. The limit regenerative braking force Freglimit may be a value determined in accordance with the above-described Equation (3) (Freglimit=μ·Wf), and is set to the upper limit of braking force under which locking of the front wheels (wheels undergoing regenerative braking) does not occur under the assumption that the regenerative braking force solely acts on the front wheels.

The present invention is not limited to the above-described embodiment, and various modifications may be employed within the scope of the present invention. The apparatus according to the embodiment is configured such that the linear-valve differential pressure fraction Fval based on the linear-valve differential pressure ΔP1 acts only on the front wheels (that is, the linear-valve differential pressure ΔP2 is maintained at zero). However, the apparatus may be configured such that linear-valve differential pressure fractions Fval based on the linear-valve differential pressures ΔP1 and ΔP2 act on the front wheels and the rear wheels, respectively. In this case, the linear-valve differential pressures ΔP1 and ΔP2 may be set to the same value, or may be changed, with a predetermined ratio therebetween, in accordance with traveling conditions and other factors.

The apparatus of the above-described embodiment is configured to obtain the limit regenerative braking force Freglimit from the road-surface frictional coefficient μ in accordance with the above-described Equation (3). However, the apparatus may be configured to obtain the limit regenerative braking force Freglimit from the road-surface frictional coefficient μ while referring to a previously prepared table (map) which defines the relation between the road-surface frictional coefficient μ and the limit regenerative braking force Freglimit.

In this case, the table is formed such that the greater the value of the road-surface frictional coefficient μ, the greater the value (table search value) to which the limit regenerative braking force Freglimit is set. For example, in the case where values of the road-surface frictional coefficient μ are classified into three sections (high μ, intermediate μ, low μ), and values (table search values) of the limit regenerative braking force Freglimit corresponding to the respective sections are represented by KGH, KGM, and KGL, the values KGH, KGM, and KGL are determined to satisfy the relation "KGH≧KGM≧KGL." In this case, the value KGH corresponding to high μ may be infinite. Also, the value KGL corresponding to low μ may be zero.

The apparatus of the above-described embodiment is configured to set the regenerative braking force Freg to the smaller value of the allowable maximum regenerative braking force Fregmax and the limit regenerative braking force Freglimit even when only the wheels not undergoing regenerative braking (the rear wheels in the present example) undergo ABS control. However, the apparatus of the above-described embodiment may be configured such that when only the wheels not undergoing regenerative braking undergo ABS control, the regenerative braking force Freg is limited to the allowable maximum regenerative braking force Fregmax or less as in the case where ABS control is not performed.

The apparatus of the above-described embodiment is configured to detect from the front-rear acceleration sensor 85 the vehicle body decoration required to obtain the road-surface frictional coefficient μ necessary for calculation of the limit regenerative braking force Freglimit. However, the apparatus may be configured to obtain the vehicle body decoration by differentiating with respect to time the estimated vehicle body speed Vso calculated in Step 810 of FIG. 8. Further, the apparatus may be configured to obtain the road-surface frictional coefficient μ through a known method of image-processing an image of the road surface photographed by means of a camera attached to a predetermined position on the vehicle. Alternatively, the apparatus may be configured to obtain the road-surface frictional coefficient μ through another known method in which the road-surface frictional coefficient μ is obtained from drive force of the driven wheels and slip rate S of the driven wheels with reference to a table (map) which defines the μ (road-surface frictional coefficient)–S (slip rate) characteristic. These methods enable the road-surface frictional coefficient μ to be obtained before start of ABS control.

The apparatus of the above-described embodiment is configured to repeatedly update, during performance of ABS control, the value of the vehicle body deceleration necessary for obtainment of the road-surface frictional coefficient μ, and repeatedly update the value of road-surface frictional coefficient μ (accordingly, the value of the limit regenerative braking force Freglimit) on the basis of the value of the vehicle body deceleration. However, the apparatus may be configured to calculate the value of road-surface frictional coefficient μ (accordingly, the value of the limit regenerative braking force Freglimit) on the basis of the value of the vehicle body deceleration obtained at the start of ABS control. In this case, throughout the period in which ABS control is performed, the value of the limit regenerative braking force Freglimit is set to a constant value corresponding to the value of the vehicle body deceleration obtained at the start of ABS control.

In the above-described embodiment, the present invention is applied to a vehicle in which the regenerative braking force Freg acts on the front wheels. However, the present invention may be applied to a vehicle in which the regenerative braking force Freg acts on the rear wheels. When the vehicle body decelerates, the load acting on the rear wheels can be obtained by subtracting the above-described dynamic load (μ·W·H/L) from the static load Wrstable of the rear wheels. Therefore, in this case, the limit regenerative braking force Freglimit can be obtained in accordance with the following Equation (4).

$$Freglimit = \mu \cdot (Wrstable - (\mu \cdot W \cdot H/L)) \qquad (4)$$

In the case where the present invention is applied to a vehicle in which regenerative braking force acts on both the front wheels and the rear wheels, it is preferred to adjust the front-wheel-side regenerative braking force so as not to exceed the limit regenerative braking force obtained in accordance with Equation (3) and to adjust the rear-wheel-side regenerative braking force so as not to exceed the limit regenerative braking force obtained in accordance with Equation (4).

In the above-described embodiment, the present invention is applied to a vehicle having a front-rear piping system. However, the present invention can be applied to a vehicle having a cross piping system.

What is claimed is:

1. A brake control apparatus for a brake apparatus of a vehicle which includes, as a power source, a motor for driving a specific wheel, the brake apparatus including frictional-braking-force control means for individually controlling frictional braking force acting on each wheel of the vehicle, independently of operation of a brake operation member by a driver, and regenerative-braking-force control means for controlling regenerative braking force which is generated by the motor and acts on the specific wheel, the brake control apparatus comprising:
   regeneration-coordinative brake control means for adjusting a ratio between the frictional braking force and the regenerative braking force in accordance with operation of the brake operation member by means of controlling the frictional-braking-force control means and the regenerative-braking-force control means such that the characteristic of the total braking force, which is the sum of the frictional braking force and the regenerative braking force, with respect to the operation of the brake operation member coincides with a preset target characteristic;

antiskid control means for performing antiskid control for each wheel, when the wheel tends to lock during operation of the brake operation member by the driver, so as to cause the frictional-braking-force control means to further adjust the frictional braking force adjusted by means of the regeneration-coordinative brake control means and acting on the wheel, to thereby suppress occurrence of locking of the wheel;

limit-regenerative-braking-force obtaining means for obtaining, as limit regenerative braking force, an upper limit of force under which locking of the specific wheel does not occur in a case in which the force acts on the specific wheel; and regenerative-braking-force adjustment means for causing the regeneration-coordinative brake control means to adjust the regenerative braking force such that the regenerative braking force does not exceed the limit regenerative braking force, when the antiskid control is performed for the specific wheel.

2. A brake control apparatus for a brake apparatus of a vehicle which includes, as a power source, a motor for driving a specific wheel, the brake apparatus including frictional-braking-force control means for individually controlling frictional braking force acting on each wheel of the vehicle, independently of operation of a brake operation member by a driver, and regenerative-braking-force control means for controlling regenerative braking force which is generated by the motor and acts on the specific wheel, the brake control apparatus comprising:

regeneration-coordinative brake control means for adjusting a ratio between the frictional braking force and the regenerative braking force in accordance with operation of the brake operation member by means of controlling the frictional-braking-force control means and the regenerative-braking-force control means such that the characteristic of the total braking force, which is the sum of the frictional braking force and the regenerative braking force, with respect to the operation of the brake operation member coincides with a preset target characteristic;

antiskid control means for performing antiskid control for each wheel, when the wheel tends to lock during operation of the brake operation member by the driver, so as to cause the frictional-braking-force control means to further adjust the frictional braking force adjusted by means of the regeneration-coordinative brake control means and acting on the wheel, to thereby suppress occurrence of locking of the wheel;

limit-regenerative-braking-force obtaining means for obtaining, as limit regenerative braking force, an upper limit of force under which locking of the specific wheel does not occur under the assumption that the force acts solely on the specific wheel; and regenerative-braking-force adjustment means for causing the regeneration-coordinative brake control means to adjust the regenerative braking force such that the regenerative braking force does not exceed the limit regenerative braking force, when the antiskid control is performed for the specific wheel.

3. A brake control apparatus according to claim 1, wherein the brake apparatus further includes road-surface-frictional-coefficient obtaining means for obtaining a road-surface frictional coefficient, which is the coefficient of friction between a road surface on which the vehicle travels and the tires of the vehicle; and the limit-regenerative-braking-force obtaining means changes the limit regenerative braking force in accordance with the road-surface frictional coefficient.

4. A brake control apparatus according to claim 3, wherein the limit-regenerative-braking-force obtaining means determines the limit regenerative braking force on the basis of load acting on the specific wheel and the road-surface frictional coefficient.

5. A brake control apparatus according to claim 4, wherein the limit-regenerative-braking-force obtaining means uses a value representing load which is determined in consideration of a variation in load stemming from deceleration of the vehicle, as the load acting on the specific wheel.

6. A brake control apparatus according to claim 1, further comprising:

allowable-maximum-regenerative-braking-force determination means for determining an allowable maximum regenerative braking force, which is the maximum value of regenerative braking force which is permitted to be generated, in accordance with conditions of the vehicle, wherein the regeneration-coordinative brake control means adjusts the frictional braking force and the regenerative braking force in accordance with operation of the brake operation member such that the regenerative braking force does not exceed the allowable maximum regenerative braking force; and the regenerative-braking-force adjustment means causes the regeneration-coordinative brake control means to adjust the regenerative braking force such that the regenerative braking force does not exceed the smaller value of the limit regenerative braking force and the allowable maximum regenerative braking force, when the antiskid control is performed for the specific wheel.

7. A brake control apparatus according to claim 1, wherein the regenerative-braking-force adjustment means causes the regeneration-coordinative brake control means to adjust the regenerative braking force such that the regenerative braking force does not exceed the limit regenerative braking force, even when the antiskid control is performed only for wheels other than the specific wheel.

8. A brake apparatus for a vehicle which includes, as a power source, a motor for driving a specific wheel, comprising:

frictional-braking-force control means for individually controlling frictional braking force acting on each wheel of the vehicle, independently of operation of a brake operation member by a driver;

regenerative-braking-force control means for controlling regenerative braking force which is generated by the motor and acts on the specific wheel;

regeneration-coordinative brake control means for adjusting a ratio between the frictional braking force and the regenerative braking force in accordance with operation of the brake operation member by means of controlling the frictional- braking-force control means and the regenerative-braking-force control means such that the characteristic of the total braking force, which is the sum of the frictional braking force and the regenerative braking force, with respect to the operation of the brake operation member coincides with a preset target characteristic;

antiskid control means for performing antiskid control for each wheel, when the wheel tends to lock, so as to cause the frictional-braking-force control means to further adjust the frictional braking force adjusted by means of the regeneration-coordinative brake control means and acting on the wheel, to thereby suppress occurrence of locking of the wheel;

limit-regenerative-braking-force obtaining means for obtaining, as limit regenerative braking force, an upper limit force under which locking of the specific wheel does not occur in a case in which the force acts on the specific wheel; and regenerative-braking-force adjustment means for causing the regeneration-coordinative brake control means to adjust the regenerative braking force such that the regenerative braking force does not exceed the limit regenerative braking force, when the antiskid control is performed for the specific wheel.

9. A brake apparatus for a vehicle which includes, as a power source, a motor for driving a specific wheel, comprising:

frictional-braking-force control means for individually controlling frictional braking force acting on each wheel of the vehicle, independently of operation of a brake operation member by a driver;

regenerative-braking-force control means for controlling regenerative braking force which is generated by the motor and acts on the specific wheel;

regeneration-coordinative brake control means for adjusting a ratio between the frictional braking force and the regenerative braking force in accordance with operation of the brake operation member by means of controlling the frictional- braking-force control means and the regenerative-braking-force control means such that the characteristic of the total braking force, which is the sum of the frictional braking force and the regenerative braking force, with respect to the operation of the brake operation member coincides with a preset target characteristic;

antiskid control means for performing antiskid control for each wheel, when the wheel tends to lock, so as to cause the frictional-braking-force control means to further adjust the frictional braking force adjusted by means of the regeneration-coordinative brake control means and acting on the wheel, to thereby suppress occurrence of locking of the wheel;

limit-regenerative-braking-force obtaining means for obtaining, as limit regenerative braking force, an upper limit force under which locking of the specific wheel does not occur under the assumption that the force acts solely on the specific wheel; and regenerative-braking-force adjustment means for causing the regeneration- coordinative brake control means to adjust the regenerative braking force such that the regenerative braking force does not exceed the limit regenerative braking force, when the antiskid control is performed for the specific wheel.

10. A medium for recording a brake control program applied to a brake apparatus for a vehicle which includes, as a power source, a motor for driving a specific wheel, the brake apparatus including frictional-braking-force control means for individually controlling frictional braking force acting on each wheel of the vehicle, independently of operation of a brake operation member by a driver, and regenerative-braking-force control means for controlling regenerative braking force which is generated by the motor and acts on the specific wheel, the brake control program comprising:

regeneration-coordinative brake control step of adjusting a ration between the frictional braking force and the regenerative braking force in accordance with operation of the brake operation member by means of controlling the frictional-braking-force control means and the regenerative-braking-force control means such that the characteristic of the total braking force, which is the sum of the frictional braking force and the regenerative braking force, with respect to the operation of the brake operation member coincides with a preset target characteristic;

antiskid control step of performing antiskid control for each wheel, when the wheel tends to lock, so as to cause the frictional-braking-force control means to further adjust the frictional braking force adjusted by the regeneration-coordinative brake control step and acting on the wheel, to thereby suppress occurrence of locking of the wheel;

limit-regenerative-braking-force obtaining step of obtaining, as limit regenerative braking force, an upper limit force under which locking of the specific wheel does not occur in a case in which the force acts on the specific wheel; and regenerative-braking-force adjustment step of adjusting the regenerative braking force such that the regenerative braking force does not exceed the limit regenerative braking force, when the antiskid control is performed for the specific wheel.

11. A medium for recording a brake control program applied to a brake apparatus for a vehicle which includes, as a power source, a motor for driving a specific wheel, the brake apparatus including frictional-braking-force control means for individually controlling frictional braking force acting on each wheel of the vehicle, independently of operation of a brake operation member by a driver, and regenerative-braking-force control means for controlling regenerative braking force which is generated by the motor and acts on the specific wheel, the brake control program comprising:

regeneration-coordinative brake control step of adjusting a ration between the frictional braking force and the regenerative braking force in accordance with operation of the brake operation member by means of controlling the frictional-braking-force control means and the regenerative-braking-force control means such that the characteristic of the total braking force, which is the sum of the frictional braking force and the regenerative braking force, with respect to the operation of the brake operation member coincides with a preset target characteristic;

antiskid control step of performing antiskid control for each wheel, when the wheel tends to lock, so as to cause the frictional-braking-force control means to further adjust the frictional braking force adjusted by the regeneration-coordinative brake control step and acting on the wheel, to thereby suppress occurrence of locking of the wheel;

limit-regenerative-braking-force obtaining step of obtaining, as limit regenerative braking force, an upper limit force under which locking of the specific wheel does not occur under the assumption that the force acts solely on the specific wheel; and regenerative-braking-force adjustment step of adjusting the regenerative braking force such that the regenerative braking force does not exceed the limit regenerative braking force, when the antiskid control is performed for the specific wheel.

* * * * *